US012790851B2

(12) United States Patent
Holmes et al.

(10) Patent No.: US 12,790,851 B2
(45) Date of Patent: Nov. 10, 2026

(54) BRACKETS FOR CROSSARMS

(71) Applicant: RS Technologies Inc., Tilbury (CA)

(72) Inventors: Scott T. Holmes, Oxford, PA (US); Shawn Van Hoek-Patterson, Victoria (CA); Leslie Allan George, Calgary (CA)

(73) Assignee: RS Technologies Inc., Calgary (CA)

( * ) Notice: Subject to any disclaimer, the term of this patent is extended or adjusted under 35 U.S.C. 154(b) by 0 days.

(21) Appl. No.: 18/694,943

(22) PCT Filed: Sep. 20, 2022

(86) PCT No.: PCT/CA2022/051387
§ 371 (c)(1),
(2) Date: Mar. 22, 2024

(87) PCT Pub. No.: WO2023/044559
PCT Pub. Date: Mar. 30, 2023

(65) Prior Publication Data

US 2024/0426128 A1 Dec. 26, 2024

Related U.S. Application Data

(60) Provisional application No. 63/314,555, filed on Feb. 28, 2022, provisional application No. 63/247,168, filed on Sep. 22, 2021.

(51) Int. Cl.
*E04H 12/24* (2006.01)
*F16B 5/08* (2006.01)

(52) U.S. Cl.
CPC ............... *E04H 12/24* (2013.01); *F16B 5/08* (2013.01)

(58) Field of Classification Search
CPC .......... E04H 12/24; F16B 5/08; F16B 7/0493; E04G 23/0218
USPC ........... 248/218.4–219.4; 403/188, 388, 346, 403/399–400; 52/697, 348, 685–686
See application file for complete search history.

(56) References Cited

U.S. PATENT DOCUMENTS 868,591 A * 10/1907 Yaxley .................... E04H 12/24 174/45 R
1,754,924 A * 4/1930 Williams ................. H02G 7/08 174/40 R
1,761,509 A * 6/1930 Williams ................ E04H 12/24 403/188
1,802,995 A * 4/1931 Williams ................ E04H 12/24 248/219.3

(Continued)

FOREIGN PATENT DOCUMENTS

JP 2005268955 9/2005
WO WO 1988008911 11/1988

*Primary Examiner* — Christopher Garft
(74) *Attorney, Agent, or Firm* — Stites & Harbison PLLC; Richard S. Myers, Jr.

(57) ABSTRACT

There is described a bracket for securing a crossarm to a utility pole. The bracket includes a pole-mounting member for mounting to the utility pole by engaging a pole-receiving side of the pole-mounting member to the utility pole. The bracket further includes a crossarm-mounting member secured to the pole-mounting member. The crossarm-mounting member includes a rear plate and walls extending from the rear plate and away from the pole-receiving side of the pole-mounting member. The rear plate and the walls define a channel for receiving the crossarm.

47 Claims, 20 Drawing Sheets

(56) References Cited

U.S. PATENT DOCUMENTS

| | | | | | |
|---|---|---|---|---|---|
| 1,815,598 | A * | 7/1931 | Stroup | H02G 7/20 | 174/45 R |
| 2,828,515 | A | 4/1958 | Jenne | | |
| 3,555,747 | A * | 1/1971 | Taylor | E04H 12/24 | 174/45 R |
| 3,653,622 | A | 4/1972 | Farmer | | |
| 3,715,460 | A | 2/1973 | Elliott et al. | | |
| 4,932,623 | A * | 6/1990 | Reisdorff | H02G 7/20 | 248/219.3 |
| 5,174,535 | A | 12/1992 | Stubbersfield | | |
| 5,228,260 | A * | 7/1993 | Dziedzic | E04H 12/24 | 403/396 |
| 5,605,017 | A * | 2/1997 | Fingerson | H02G 7/20 | 174/45 R |
| 6,520,462 | B2 | 2/2003 | Herron | | |
| 6,862,861 | B1 * | 3/2005 | Lin | H02G 7/20 | 248/219.3 |
| 9,912,135 | B2 | 3/2018 | Rodriguez et al. | | |
| 2003/0168560 | A1 * | 9/2003 | Chipka | A47B 57/565 | 248/235 |
| 2016/0258177 | A1 * | 9/2016 | Faries | F16M 13/02 | |
| 2018/0058628 | A1 * | 3/2018 | Britt, Jr. | E04H 12/20 | |
| 2019/0128473 | A1 | 5/2019 | Britt | | |
| 2021/0111548 | A1 * | 4/2021 | Woodbridge | E04H 12/24 | |
| 2022/0094149 | A1 * | 3/2022 | Lal | H02G 7/05 | |

* cited by examiner

FIG. 4C
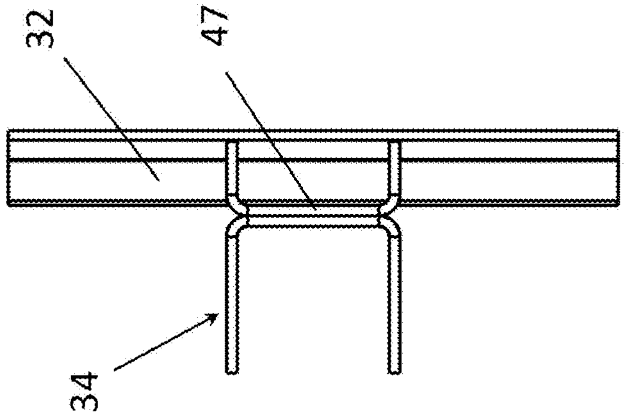
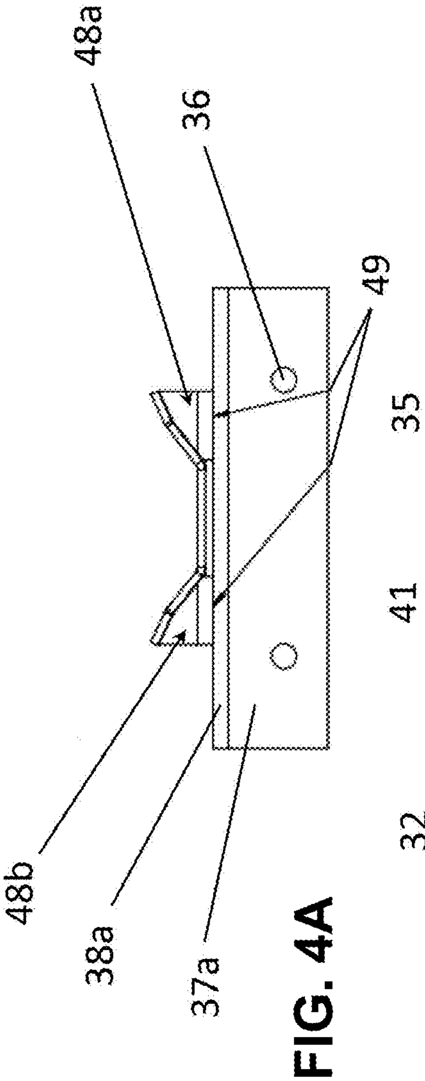
FIG. 4A
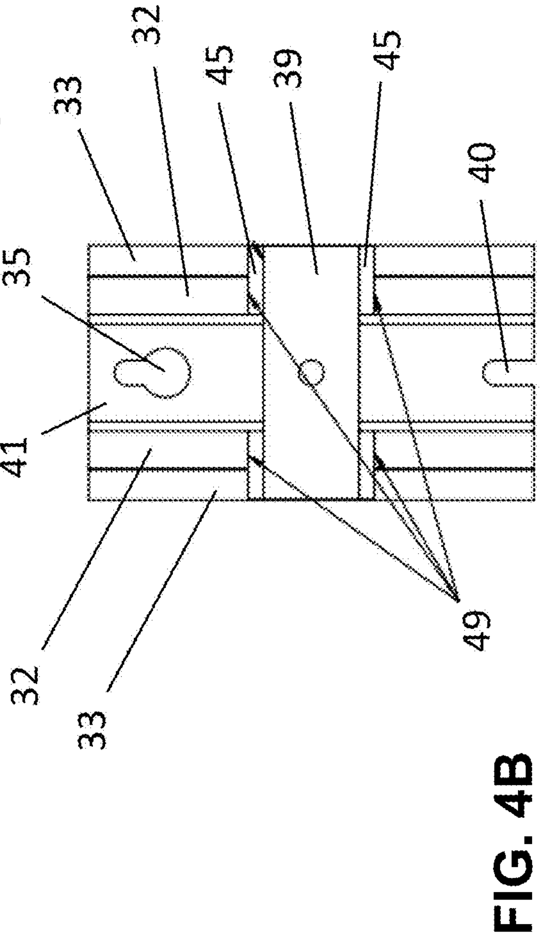
FIG. 4B

FIG. 7C
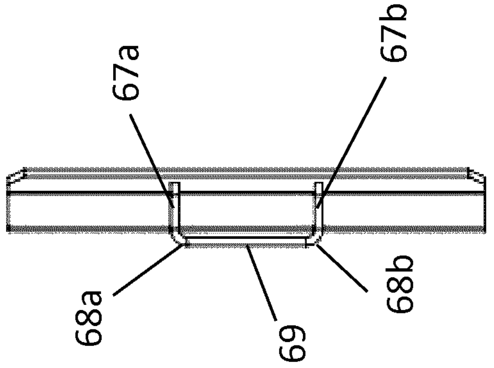
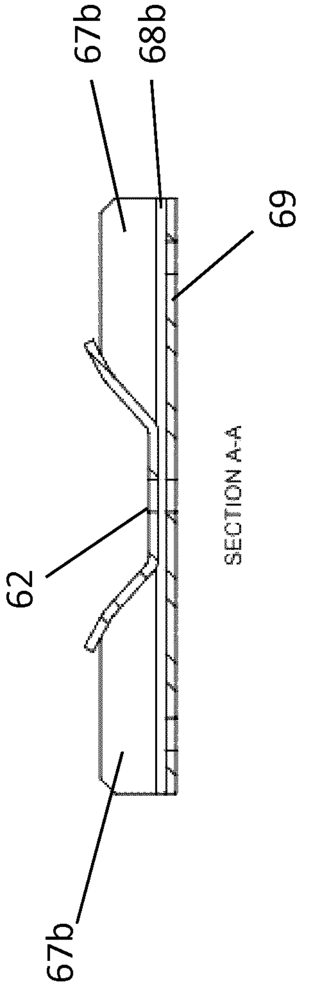
FIG. 7A
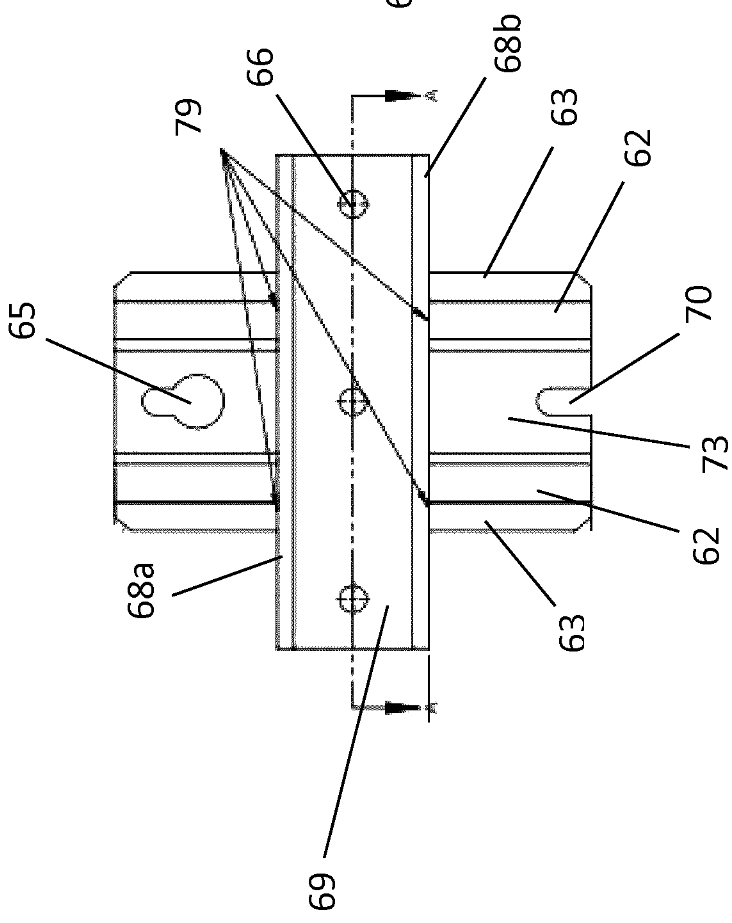
FIG. 7B

BRACKETS FOR CROSSARMS

RELATED APPLICATIONS

This application is a national stage application, filed under 35 U.S.C. § 371, of International Patent Application No. PCT/CA2022/0451387, filed Sep. 20, 2022, which claims the benefit of U.S. Provisional Application Ser. No. 63/247,168, filed Sep. 22, 2021 and U.S. Provisional Application Ser. No. 63/314,555, filed Feb. 28, 2022, the entire disclosure of which is incorporated herein by this reference.

FIELD

The present disclosure relates to brackets for crossarms, for example for securing crossarms to utility pole structures.

BACKGROUND

A crossarm bracket provides a structural interface between a crossarm and a pole structure, thereby enabling the transfer of loads from conductors/insulators though the crossarm and into the pole structure. The bracket should handle both the loads and ranges of deflections present in the crossarm as well as be able to properly transfer the loads to the pole structure without excessive local deformation or stress to the pole or the crossarm.

In order to transfer the loads and interface with metallic hardware for bolting and securement of the crossarm to the pole, the bracket is traditionally composed of steel that is coated or treated for corrosion resistance. Other materials may be used if their strength and stiffness are comparable to those of a steel bracket.

Due to the mounting of the crossarm on one side of the pole structure and the location of the conductors away from the pole and toward outboard ends of the crossarm, moments are created when loading is introduced from the conductors into the pole interface through attachment points to the structures. These load paths and structural connection points should be taken into account in the design of an efficient and robust crossarm bracket. The bracket typically comprises an interface for securing to the crossarm and an interface for securing to the pole.

Limitations of existing brackets include strength limitations, weld failures, excessive deflection, yielding failure under certain loading conditions, insufficient bearing interaction at connection points, and corrosion. The present disclosure seeks to provide improved crossarm brackets that address at least some of these shortcomings found in the prior art.

SUMMARY

According to a first aspect of the disclosure, there is provided a bracket for securing a crossarm to a utility pole, comprising: a pole-mounting member for mounting to the utility pole by engaging a pole-receiving side of the pole-mounting member to the utility pole; a crossarm-mounting member secured to the pole-mounting member and comprising: a rear plate; and walls extending from the rear plate and away from the pole-receiving side of the pole-mounting member, wherein the rear plate and the walls define a channel for receiving the crossarm, and wherein the bracket further comprises at least one supporting member secured to the rear plate of the crossarm-mounting member and to the pole-mounting member, for resisting a load applied to the crossarm-mounting member when the crossarm is received within the channel.

The at least one supporting member may comprise: a first supporting member on a first side of a longitudinal axis defined by the pole-mounting member; and a second supporting member on a second side of the longitudinal axis, wherein the second side is opposite the first side.

The at least one supporting member may comprise: a plate portion secured to the rear plate of the crossarm-mounting member; and a pair of gusset portions extending from the plate portion and secured to the pole-mounting member.

The pair of gussets portions may meet the plate portion along respective curved edges.

The crossarm-mounting member may be welded to the pole-mounting member.

The pole-mounting member may comprise one or more mounting apertures at a top end thereof, for receiving one or more fasteners for mounting the pole-mounting member to the utility pole.

The one or more apertures may comprise at least one key-hole aperture.

The pole-mounting member may comprise a mounting recess at a bottom edge thereof, for mounting the pole-mounting member to the utility pole.

The mounting recess may extend from the bottom edge of the pole-mounting member upwards towards a top edge of the pole-mounting member.

The pole-mounting member has a generally frustoconical cross-sectional shape.

The pole-mounting member may comprise: a first plate portion; a pair of second plate portions angled relative to the first plate portion, extending from the first plate portion, and extending away from the crossarm-mounting member; and a pair of third plate portions angled relative to the second plate portions, extending from the second plate portions, and extending away from the crossarm-mounting member.

The at least one supporting member may be secured to one or more of the pair of second plate portions and the pair of third plate portions.

The at least one supporting member may be welded to one or more of the pair of second plate portions and the pair of third plate portions The walls of the crossarm-mounting member may meet the rear plate of the crossarm-mounting member along respective curved edges.

The crossarm-mounting member may comprise apertures for receiving fasteners therethrough.

According to a further aspect of the disclosure, there is provided a bracket for securing a crossarm to a utility pole, comprising: a pole-mounting member for mounting to the utility pole by engaging a pole-receiving side of the pole-mounting member to the utility pole; a crossarm-mounting member welded to the pole-mounting member and comprising: a rear plate; and walls extending from the rear plate and away from the pole-receiving side of the pole-mounting member, wherein the rear plate and the walls define a channel for receiving the crossarm.

According to a further aspect of the disclosure, there is provided a bracket for securing a crossarm to a utility pole, comprising: a pole-mounting member for mounting to the utility pole by engaging a pole-receiving side of the pole-mounting member to the utility pole; a crossarm-mounting member secured to the pole-mounting member and comprising: a mounting plate for mounting the crossarm to the crossarm-mounting member; and walls extending from the mounting plate and toward the pole-receiving side of the pole-mounting member.

The walls may comprise upper walls and lower walls, and the upper walls and the lower walls may define a groove within which is received the pole-mounting member.

A cross-sectional shape of the pole-mounting member may substantially conform to a shape of the groove.

The crossarm-mounting member may comprise apertures for receiving fasteners therethrough.

The pole-mounting member may comprise one or more mounting apertures at a top end thereof, for receiving one or more fasteners for mounting the pole-mounting member to the utility pole.

The one or more apertures may comprise at least one key-hole aperture.

The bracket may further comprise a first reinforcing doubler secured to the pole-mounting member.

The first reinforcing doubler may comprise one or more doubler apertures formed therein.

A shape of the one or more doubler apertures may correspond to a shape of the one or more mounting apertures of the pole-mounting member.

The pole-mounting member may comprise a mounting recess at a bottom edge thereof, for mounting the pole-mounting member to the utility pole.

The mounting recess may extend from the bottom edge of the pole-mounting member upwards towards a top edge of the pole-mounting member.

The bracket may further comprise a second reinforcing doubler secured to the pole-mounting member.

The second reinforcing doubler may comprise a doubler recess formed therein.

A shape of the doubler recess may correspond to a shape of the mounting recess of the pole-mounting member.

The pole-mounting member may have a generally frustoconical cross-sectional shape.

The pole-mounting member may comprise: a first plate portion; a pair of second plate portions angled relative to the first plate portion, extending from the first plate portion, and extending away from the crossarm-mounting member; and a pair of third plate portions angled relative to the second plate portions, extending from the second plate portions, and extending away from the crossarm-mounting member.

The bracket may further comprise a support member secured to the pole-mounting member in a position for supporting the crossarm when the crossarm is mounted to the mounting plate.

The support member may comprise a plate portion and a pair of gusset portions extending from the plate portion and secured to the pole-mounting member.

The plate portion may meet the pair of gusset portions at respective curved edges.

The bracket may further comprise a guy-wire attachment for securing the bracket to a guy-wire.

The guy-wire attachment may comprise one or more tab members secured to an underside of at least one of the walls of the crossarm-mounting member and to the pole-mounting member.

The guy-wire attachment may comprise a first end secured relative to the crossarm-mounting member and a second end comprising one or more rotating members rotatable relative to the guy-wire attachment.

The guy-wire attachment may comprise a plate member secured to at least one of the walls of the crossarm-mounting member.

The bracket may further comprise a further plate member secured to at least another one of the walls of the crossarm-mounting member.

According to a further aspect of the disclosure, there is provided a bracket for securing a crossarm to a utility pole, comprising: a pole-mounting member comprising: a pole-receiving side, wherein the pole-mounting member is mountable to the utility pole by engaging the pole-receiving side to the utility pole; and a front surface on a front side of the pole-mounting member, wherein the front side is opposite the pole-receiving side; an upper plate secured to the front surface of the pole-mounting member and extending away from the pole-receiving side of the pole-mounting member; and a lower plate secured to the front surface of the pole-mounting member and extending away from the pole-receiving side of the pole-mounting member, wherein the upper plate includes a lower surface facing the lower plate, and the lower plate includes an upper surface facing the upper plate, and wherein the lower surface of the upper plate, the upper surface of the lower plate, and the front surface of the pole-mounting member define interconnected walls of a channel for receiving therein at least a portion of the crossarm.

The bracket may further comprise a supporting member secured to the lower plate and to the front surface of the pole-mounting member, for resisting a load applied to the lower plate when the crossarm is received within the channel.

The supporting member may further comprise one or more apertures formed therein for attaching a guy-wire to the supporting member.

The supporting member may extend perpendicularly to the lower plate.

One or both of the upper plate and the lower plate may be welded to the front surface of the pole-mounting member.

The pole-mounting member may comprise one or more mounting apertures at a top end thereof, for receiving one or more fasteners for mounting the pole-mounting member to the utility pole.

The one or more apertures may comprise at least one key-hole aperture.

The pole-mounting member may comprise a mounting recess at a bottom edge thereof, for mounting the pole-mounting member to the utility pole.

The mounting recess may extend from the bottom edge of the pole-mounting member upwards towards a top edge of the pole-mounting member.

The pole-mounting member may have a generally frustoconical cross-sectional shape.

Each of the upper plate and the lower plate may be secured across an entirety of a width of the front surface of the pole-mounting member.

The pole-mounting member may comprise: a first plate portion defining the front surface of the pole-mounting member; a pair of second plate portions angled relative to the first plate portion, and extending from the first plate portion and away from the upper plate and the lower plate; and a pair of third plate portions angled relative to the second plate portions, and extending from the second plate portions and away from the upper plate and the lower plate.

Each of the upper plate and the lower plate may be secured across an entirety of a width of the first plate portion.

Each of the upper plate and the lower plate may be further secured to at least a portion of each of the second plate portions.

Each of the upper plate and the lower plate may be welded to the at least a portion of each of the second plate portions.

The upper plate and the lower plate may extend perpendicularly to the pole-mounting member.

Each of the upper plate and the lower plate may comprise apertures for receiving fasteners therethrough, for securing the crossarm to the upper plate and the lower plate when the crossarm is received within the channel.

Each of the upper plate and the lower plate may comprise a front edge, side edges extending from the front edge and toward the pole-receiving side of the pole-mounting member, and a pair of rear edges extending at obtuse angles to the side edges and toward the pole-receiving side of the pole-mounting member.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIGS. 4A, 4B, and 4C are respectively top, front, and side-on views of the deadend bracket of FIG. 3;

FIGS. 7A, 7B, and 7C are cross-sectional, front, and side views of the tangent bracket of FIG. 6;

DETAILED DESCRIPTION

The present disclosure seeks to provide improved brackets for crossarms. While various embodiments of the disclosure are described below, the disclosure is not limited to these embodiments, and variations of these embodiments may well fall within the scope of the disclosure which is to be limited only by the appended claims.

Generally, according to embodiments of the disclosure, there are described brackets for supporting loads exerted on crossarms by conductors, guy wires, and other external sources. Under certain loading conditions, existing metallic brackets are susceptible to failure by cracking at weld lines or yielding. Brackets according to embodiments described herein may address potential weak points of existing brackets by providing assemblies that in use are less likely to experience yielding or cracking. For example, by optimizing the thickness, weld locations, and design elements to be more structurally efficient, adequate strength and stiffness may be provided for handling symmetric or asymmetric loading. Furthermore, the design may benefit from improved performance in actual field operations and over the life of the structure. This may ensure that brackets according to embodiments described herein may be reliable and resilient against actual field conditions throughout the service life of the bracket, and may minimize the risk of any potential failures or power outages that might result from improper bracket performance.

Figure 1:
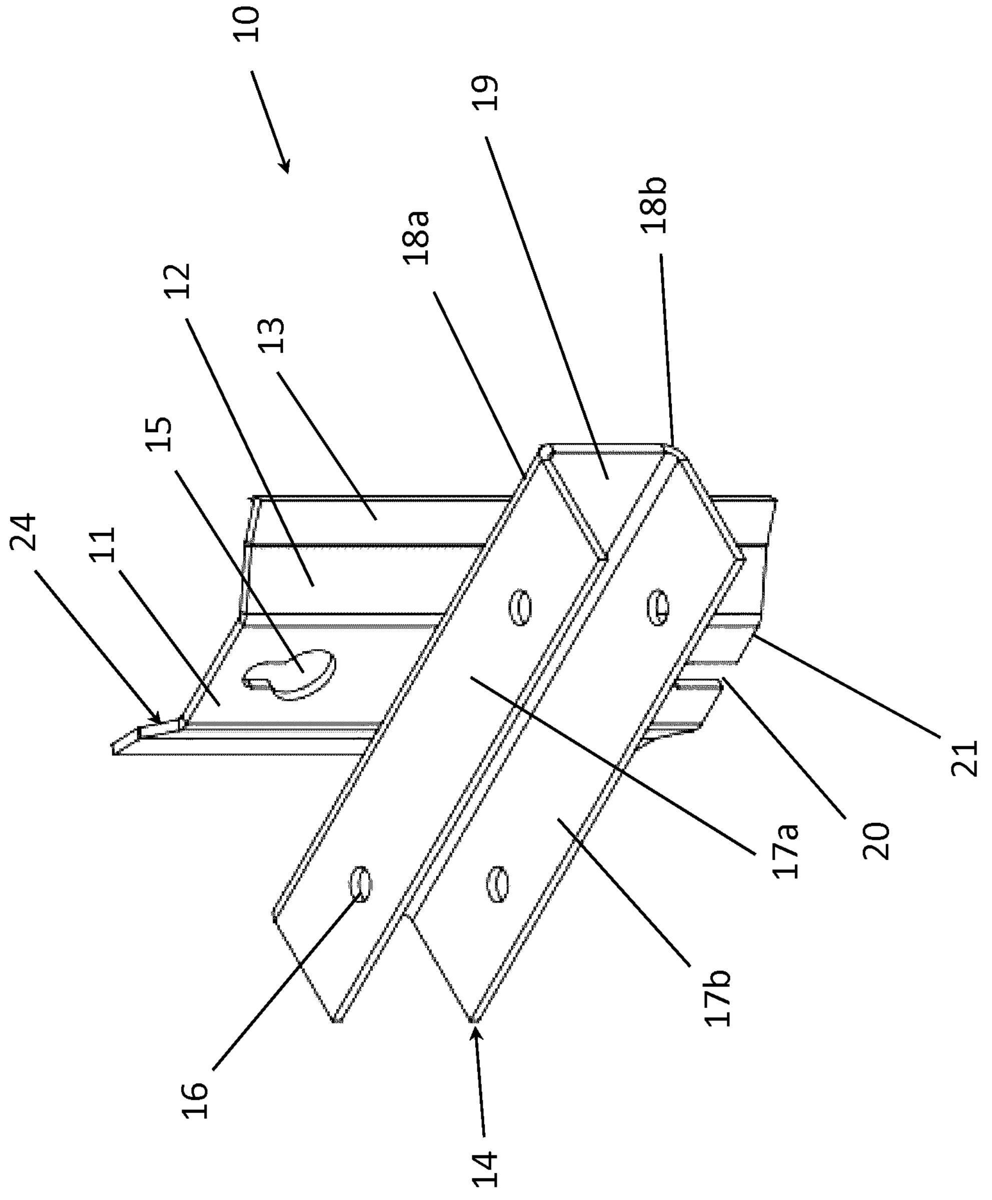
FIG. 1 is a perspective view of a deadend bracket according to an embodiment of the disclosure.
Figure 2A:
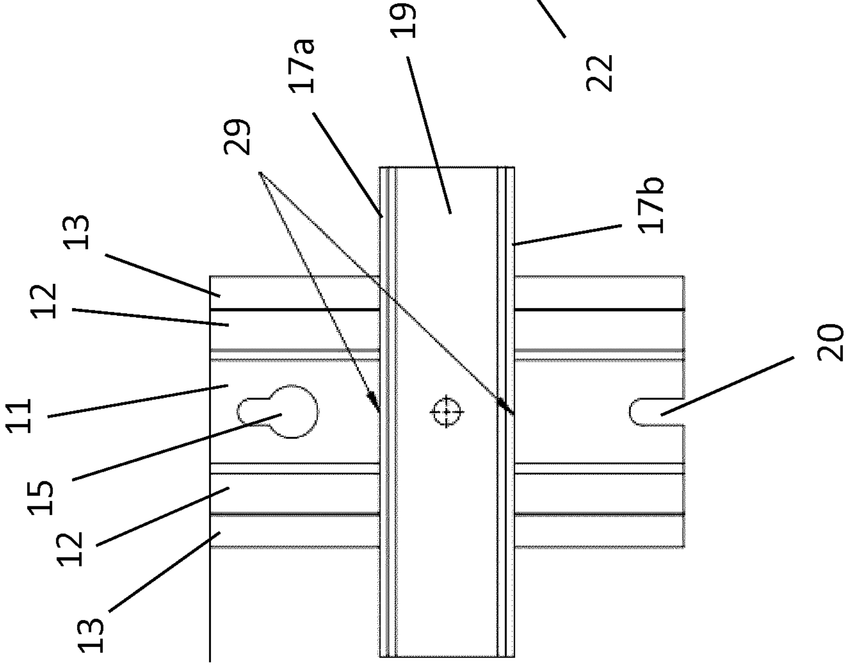
FIGS. 2A and 2B are front and side views of the deadend bracket of FIG. 1.
Figure 2B:
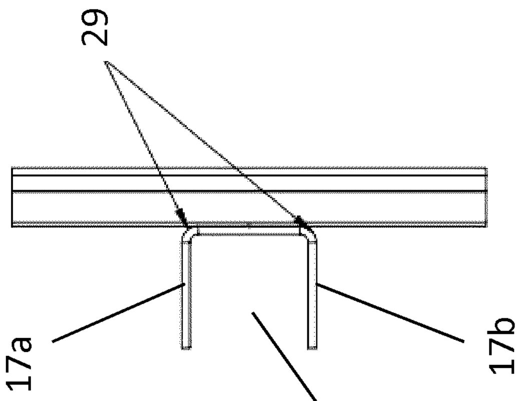
Figure 3:
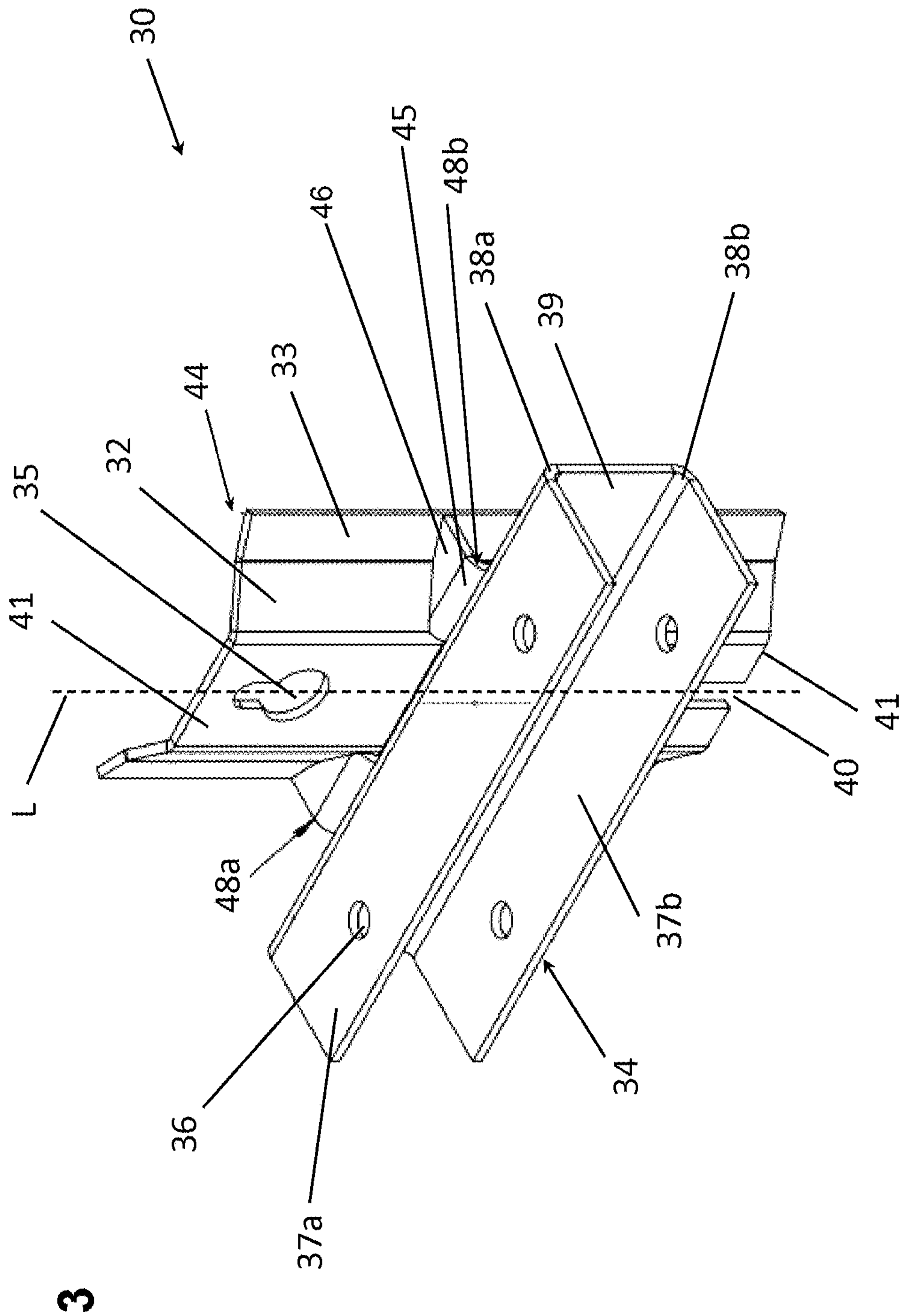
FIG. 3 is a perspective view of a deadend bracket with gussets and doublers for providing increased strength and stiffness, according to an embodiment of the disclosure.

Turning to FIGS. 1, 2A, and 2B, there are shown different views of an embodiment of a deadend bracket 10 for securing a crossarm to a utility pole. Deadend bracket 10 may be used to transfer primary and secondary conductor loads, in deadend applications, from the crossarm to the utility pole.

Deadend bracket 10 comprises a vertically-oriented pole-mounting member 24, and a horizontally-oriented crossarm-mounting member 14 secured to pole-mounting member 24. It will be understood that the terms "vertically-oriented" and "horizontally-oriented" are relative terms, and are used to described the respective orientations of pole-mounting member 24 and crossarm-mounting member 14 relative to a vertically-oriented utility pole (not shown). It shall therefore be understood that, in other contexts, pole-mounting member 24 need not be vertically oriented, and crossarm-mounting member 14 need not be horizontally oriented.

Pole-mounting member 24 includes a pole-receiving side and a crossarm-receiving side opposite the pole-receiving side. Pole-mounting member 24 is used to mount deadend bracket 10 to a utility pole by engaging the pole-receiving side of pole-mounting member 24 to the utility pole, as described in further detail below. Pole-mounting member 24 enables deadend bracket 10 to interface with the utility pole and transfer the load applied by the crossarm over a relatively large area, while securing deadend bracket 10 to the utility pole. As described in further detail below, pole-mounting member 24 is shaped to conform to the round shape of utility pole tops, with a tapered flange design that enables deadend bracket 10 to mate to a range of pole diameters and make contact with the utility pole along the vertical length of pole-mounting member 24.

When viewed along a horizontal cross-section, pole-mounting member 24 has a generally frustoconical shape. In particular, pole-mounting member 24 includes a first plate portion 11, a pair of second plate portions 12, and a pair of third plate portions 13. Second plate portions 12 are angled relative to first plate portion 11, and extend away from crossarm-mounting member 14. Third plate portions 13 are angled relative to second plate portions 12 and extend away from crossarm-mounting member 14. Second plate portions 12 are angled relative to first plate portion 11 such that the obtuse angles formed therebetween are located on the pole-receiving side of pole-mounting member 24. Third plate portions 13 are angled relative to second plate portion 12 such that the obtuse angles formed therebetween are located on the crossarm-receiving side of pole-mounting member 24. This angling may result in a relatively smooth radius on the pole-receiving side at the interface of second plate portions 12 and third plate portions 13. This may ensure that little or no gouging of the underlying pole will occur, which may be important for ensuring structural integrity of the pole.

Pole-mounting member 24 includes a number of mounting apertures for mounting deadend bracket 10 to the utility pole. In particular, at an upper end of pole-mounting member 24, there is provided a key-hole aperture 15. At a bottom end of pole-mounting member 24, there is provided a mounting recess 20, forming a slot feature, extending from a bottom edge 21 of pole-mounting member 24 upwards towards a top edge of pole-mounting member 24. In order to mount deadend bracket 10 to a utility pole, key-hole aperture 15 and mounting recess 20 are aligned with and receive corresponding fasteners provided on the utility pole. Deadend bracket 10 is then translated downwardly until the fasteners engage with key-hole aperture 15 and mounting recess 20, at which point the fasteners are tightened to the recommended torque to ensure they will not loosen over time, thereby securing deadend bracket 10 to the utility pole.

Crossarm-mounting member 14 comprises a rear plate 19 and upper and lower walls 17*a*, 17*b* extending perpendicularly from rear plate 19 and away from the pole-receiving side of pole-mounting member 24. The edges 18*a*, 18*b* along which rear plate 19 meets with upper and lower walls 17*a*, 17*b* are curved (by being formed to conform to a crossarm profile) in order to assist with load distribution when the crossarm is secured to crossarm-mounting member 14. Crossarm-mounting member 14 is secured to pole-mounting member 24 by welding crossarm-mounting member 14 to pole-mounting member 24 at example weld locations 29 along first plate portion 11 and edges 18*a*, 18*b*, as seen FIGS. 2A and 2B.

As can be seen in FIG. 1, the respective orientations of rear plate 19 and upper and lower walls 17*a*, 17*b* define a channel 22 (FIG. 2B) within which a crossarm may be received. Mounting apertures 16 are provided within upper and lower walls 17*a*, 17*b* of crossarm-mounting member 14. Fasteners such as through-bolts with nuts are used to secure the crossarm to crossarm-mounting member 14 with the crossarm received within channel 22. Channel 22 is shaped such that the crossarm is securely attached to crossarm-mounting member 14, with upper and lower walls 17*a*, 17*b* creating a surface against which fastening nuts can bear tightly for securing the crossarm to crossarm-mounting member 14. Crossarm-mounting member 14 may therefore wrap around the crossarm to resist deflection and yielding of deadend bracket 10 from termination loads at the end of the power line.

Turning to FIGS. 3, 4A, 4B, and 4C, there is shown another embodiment of a deadend bracket 30. Deadend bracket 30 is similar to deadend bracket 10, and therefore similar features are labelled using similar reference numbers. Unlike deadend bracket 10, deadend bracket 30 includes a pair of supporting doublers 48 for providing additional load resistance for example under heavy duty deadend loading conditions. Supporting doublers 48 include gussets 46 to further constrain crossarm-mounting member 34 relative to pole-mounting member 44 and limit overall bending in the power line direction of crossarm-mounting member 34.

In particular, deadend bracket 30 includes a first supporting doubler 48*a* on a left-hand side of a longitudinal axis L of pole-mounting member 44, and a second supporting doubler 48*b* on a right-hand side of longitudinal axis L. Each supporting member 48*a*, 48*b* includes a plate portion 47 secured by welding to rear plate 39 of crossarm-mounting member 34. Each supporting member 48*a*, 48*b* further includes a pair of triangular-shaped gusset portions 46 extending from plate portion 47 and secured to pole-mounting member 44. In particular, each gusset portion 46 is secured by welding to a second plate portion 32 and a third plate portion 33 of pole-mounting member 44. Example weld locations 49 can be seen in FIGS. 4A and 4B (in FIG. 4B, crossarm-mounting member 34 is removed for clarity). According to some embodiments, each gusset portion 46 may be secured to only one of second plate portion 32 and third plate portion 33. Gusset portions 46 meet plate portion 47 along respective curved edges 45.

Figure 5:
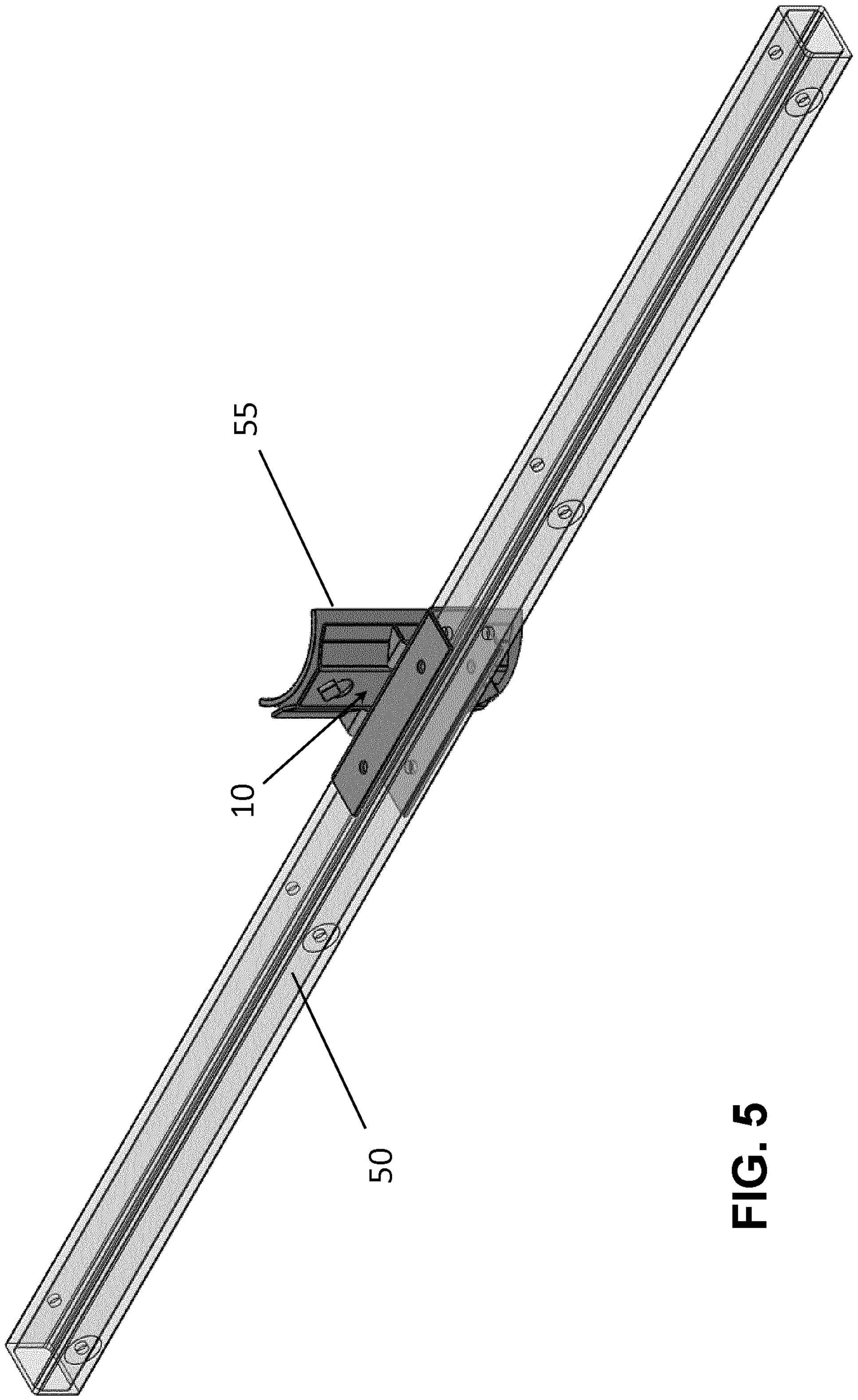
FIG. 5 shows a crossarm secured to a utility pole using a deadend bracket according to an embodiment of the disclosure.
Figure 6:
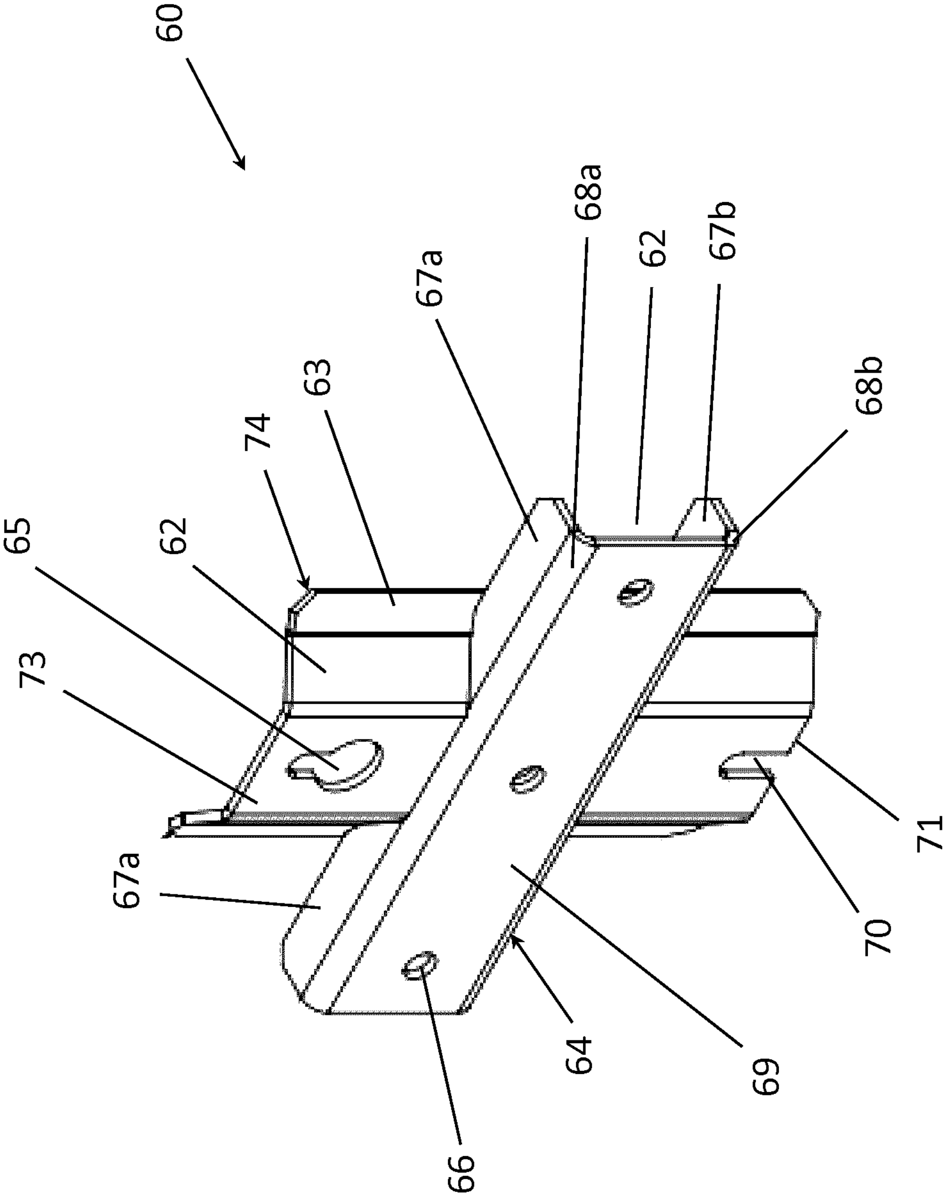
FIG. 6 is a perspective view of a tangent bracket according to an embodiment of the disclosure.

Turning to FIG. 5, there is shown an embodiment of a crossarm 50 secured to deadend bracket 30. Bolts extend vertically through crossarm 50 at locations 36. The bolts are aligned transverse to the conductors in the deadend application to react to longitudinal loads of the conductors. Together, pole-mounting member 44 and crossarm-mounting member 34 work together to minimize deflection and avoid yielding or structural failures.

Turning to FIGS. 6 and 7A-7C, there are shown different views of an embodiment of a tangent bracket 60 for securing a crossarm to a utility pole. Tangent bracket 60 may be used to transfer primary and secondary conductor loads from the crossarm to the utility pole.

Tangent bracket 60 is similar to deadend bracket 10, and similar features are therefore labelled using similar reference numbers. However, unlike crossarm-mounting member 14 of deadend bracket 10, crossarm-mounting member 64 of tangent bracket 60 comprises a mounting plate 69, pair of spaced-apart upper walls 67*a* extending from mounting plate 69, and a pair of spaced-apart lower walls 67*b* extending from mounting plate 69. Upper walls 67*a* and lower walls 67*b* therefore define a groove extending in a vertical direction centrally relative to ends of crossarm-mounting member 64. Pole-mounting member 74 is received within the groove and secured to crossarm-mounting member 64 by welding, as can be seen by the example weld locations 79 in FIG. 7B. With pole-mounting member 74 received within the groove defined in crossarm-mounting member 64, crossarm-mounting member 64 is oriented such that the channel 62 defined by mounting plate 69, upper walls 67*a*, and lower walls 67*b* faces toward the pole-receiving side of pole-mounting member 74.

In order to secure the crossarm to tangent bracket 60, mounting holes 66 are provided within mounting plate 69 of crossarm-mounting member 64. The crossarm is then secured to mounting plate 69 using fasteners such as bolts, reinforced by flat washers and nuts on the opposing side of the crossarm, to secure tightly the crossarm to bracket 60. Multiple mounting holes 66 enable the load to be spread over multiple fasteners to constrain a relatively larger area of the crossarm to tangent bracket 60, thereby minimizing deflection of the crossarm. Mounting holes 66 are aligned in the plane of the conductors in the tangent application to primarily react to transverse and vertical crossarm loads. In use, the C-shaped channel 62 defined by mounting plate 69, upper walls 67*a*, and lower walls 67*b* may help further resist deflection and yielding of tangent bracket 60.

Figure 8:
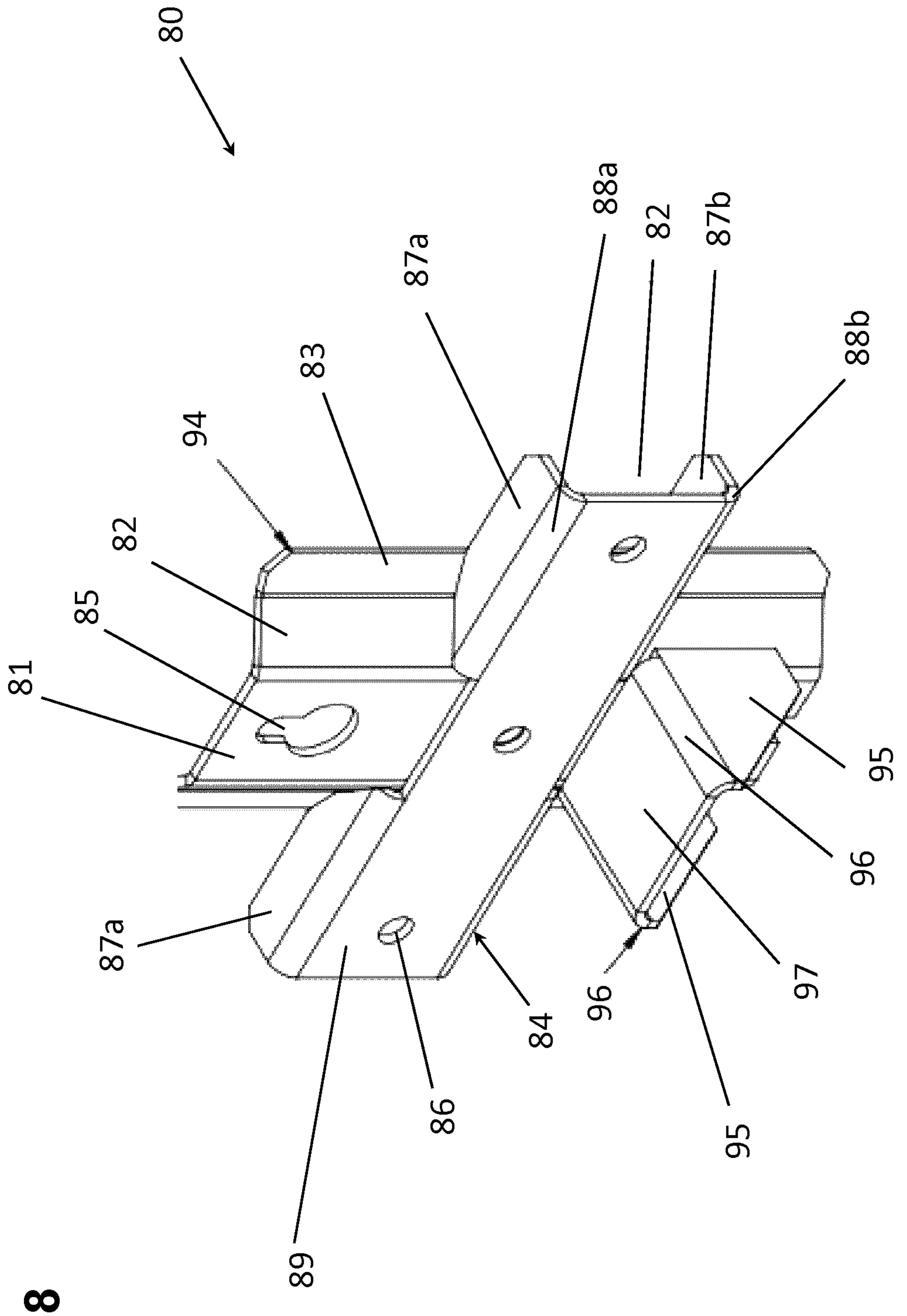
FIG. 8 is a perspective view of a tangent bracket with a central support member for providing increased strength and stiffness for medium duty applications, according to an embodiment of the disclosure.
Figure 9A:
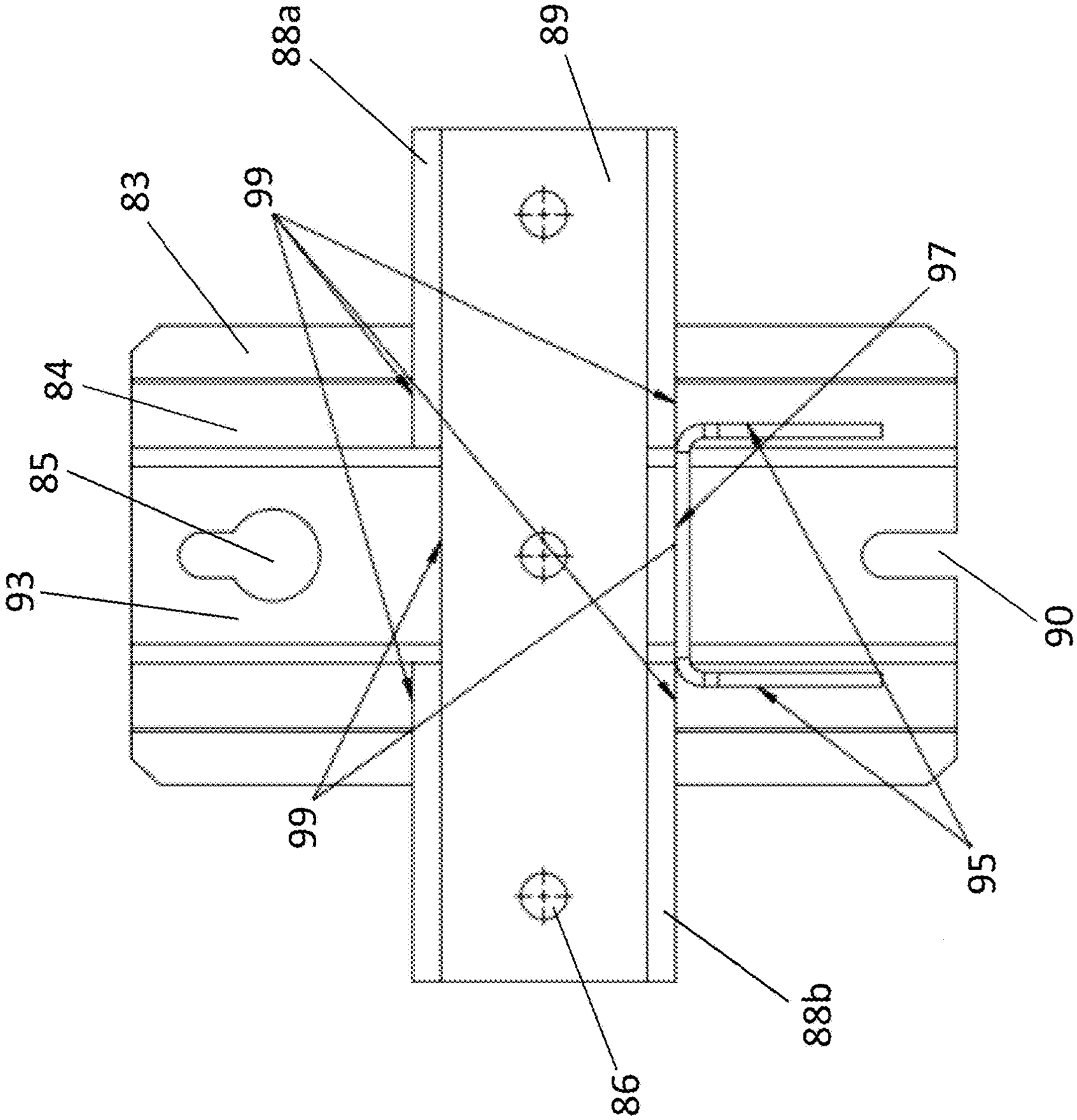
FIGS. 9A and 9B are front and side views of the tangent bracket of FIG. 8.
Figure 9B:
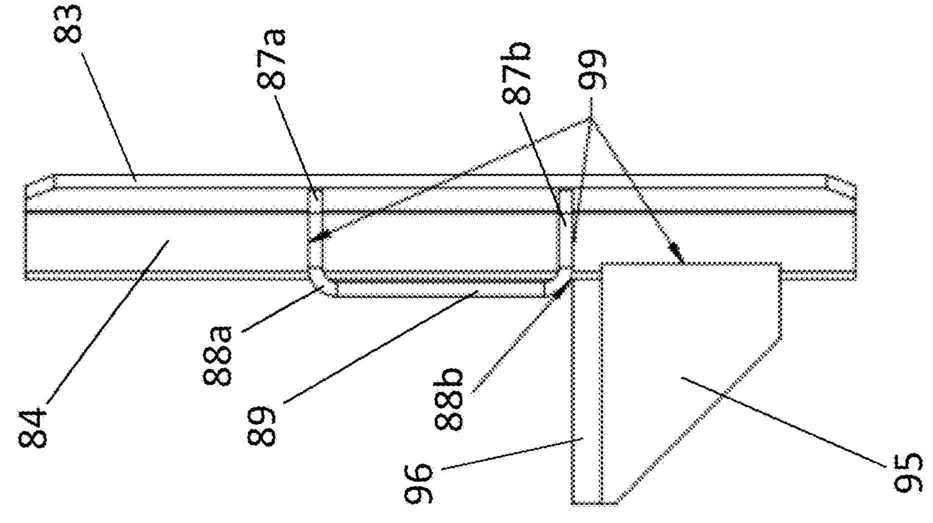

Turning to FIGS. 8, 9A, and 9B, there are shown different view of another embodiment of a tangent bracket 80. Tangent bracket 80 is similar to tangent bracket 60 but may be used for heavier-duty tangent crossarm applications. In particular, tangent bracket 80 includes a support member secured to pole-mounting member 94 in a position for supporting the crossarm when the crossarm is mounted to mounting plate 89.

The support member comprises a plate portion 97 and a pair of triangular gusset portions 95 extending from plate portion 97 and secured to pole-mounting member 94. The pair of gussets portions 95 meet plate portion 97 along respective curved edges 96. Plate portion 97 is welded to first plate portion 81 of pole-mounting member 94, immediately beneath mounting plate 89, and gusset portions 95 are welded to second plate portions 82 of pole-mounting member 94. Example weld locations 95 are shown in FIGS. 9A and 9B. Plate portion 97 and gusset portions 95 may provide tangent bracket 80 with greater stiffness once welded to pole-mounting member 94, and tangent bracket 80 may therefore provide additional support to the crossarm.

Turning to FIGS. 10 and 11A-11C, there are shown different view of another embodiment of a tangent bracket 80. Tangent bracket 80 is similar to tangent bracket 60 but may be used for still heavier or extreme duty applications. In particular, further resistance to distortion of the bracket may be achieved through the addition of reinforcing doublers in proximity to the locations where fasteners are used to secure pole-mounting member 114 to the utility pole.

Figure 10:
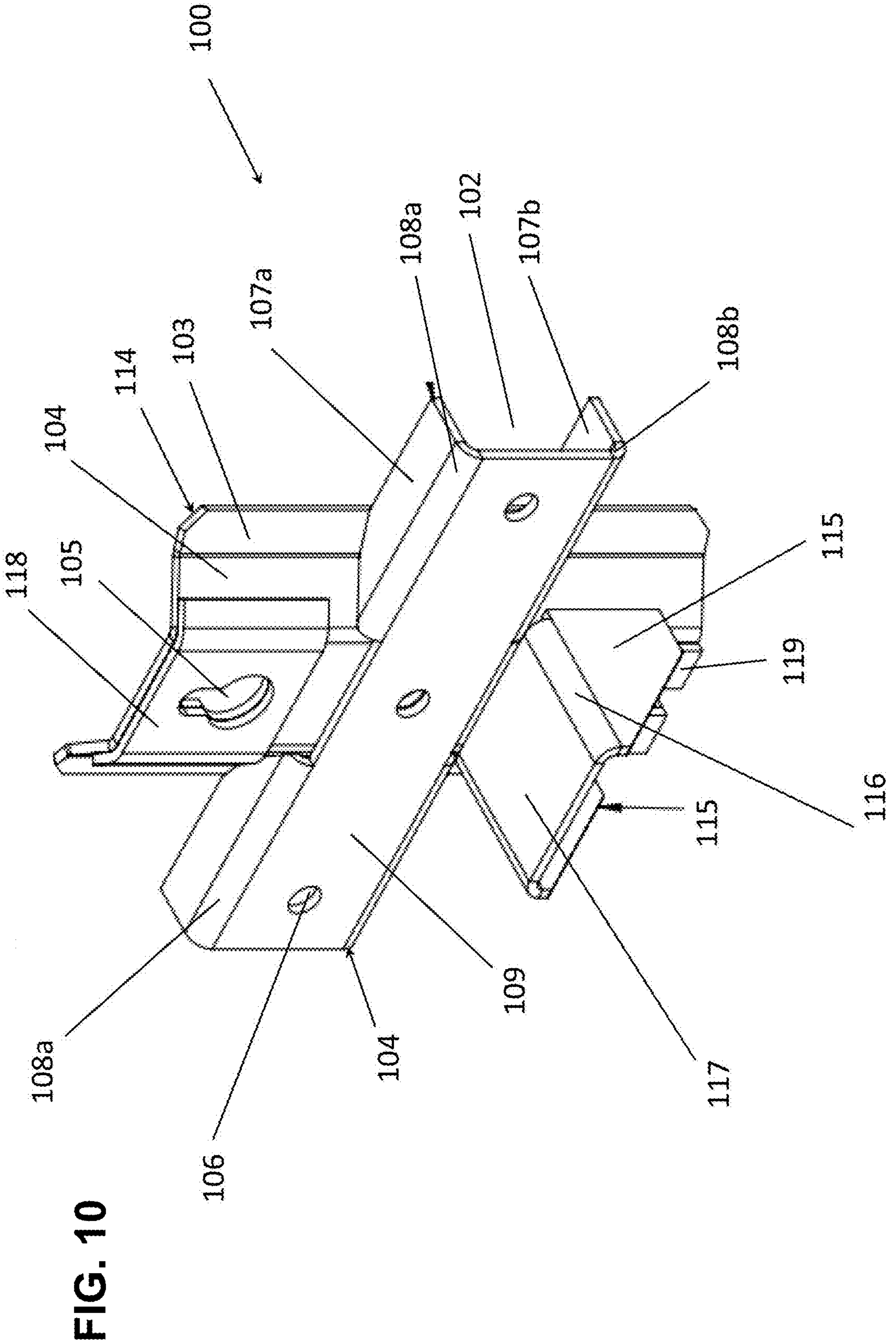
FIG. 10 is a perspective view of a tangent bracket with a central support member and doublers for providing further increased strength and stiffness for heavy-duty applications, according to an embodiment of the disclosure.

As can be seen in FIG. 10, for example, tangent bracket 80 includes a first reinforcing doubler 118 secured, for example by welding, to pole-mounting member 114. Reinforcing doubler 118 has a keyhole aperture formed therein whose shape conforms to the shape of keyhole aperture 105 formed within pole-mounting member 114. Reinforcing doubler 118 may provide increased strength and local stiffness to pole-mounting member 114 when pole-mounting member 114 is mounted to the utility pole by engaging a corresponding fastener with keyhole aperture 105 and reinforcing doubler 118.

Figure 11C:
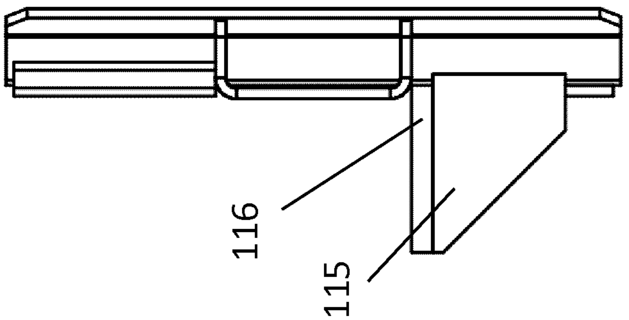
FIGS. 11A, 11B, and 11C are top, front, and side views of the tangent bracket of FIG. 9.
Figure 11A:
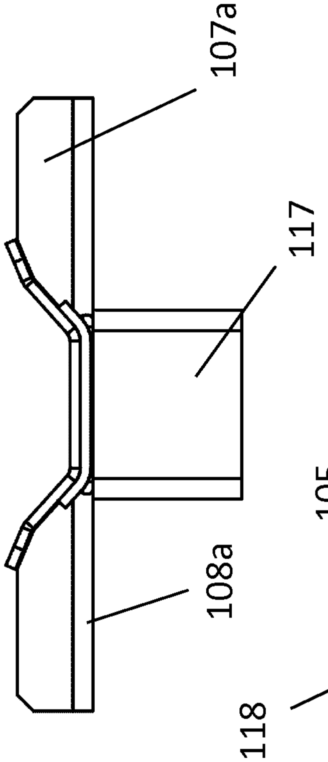
Figure 11B:
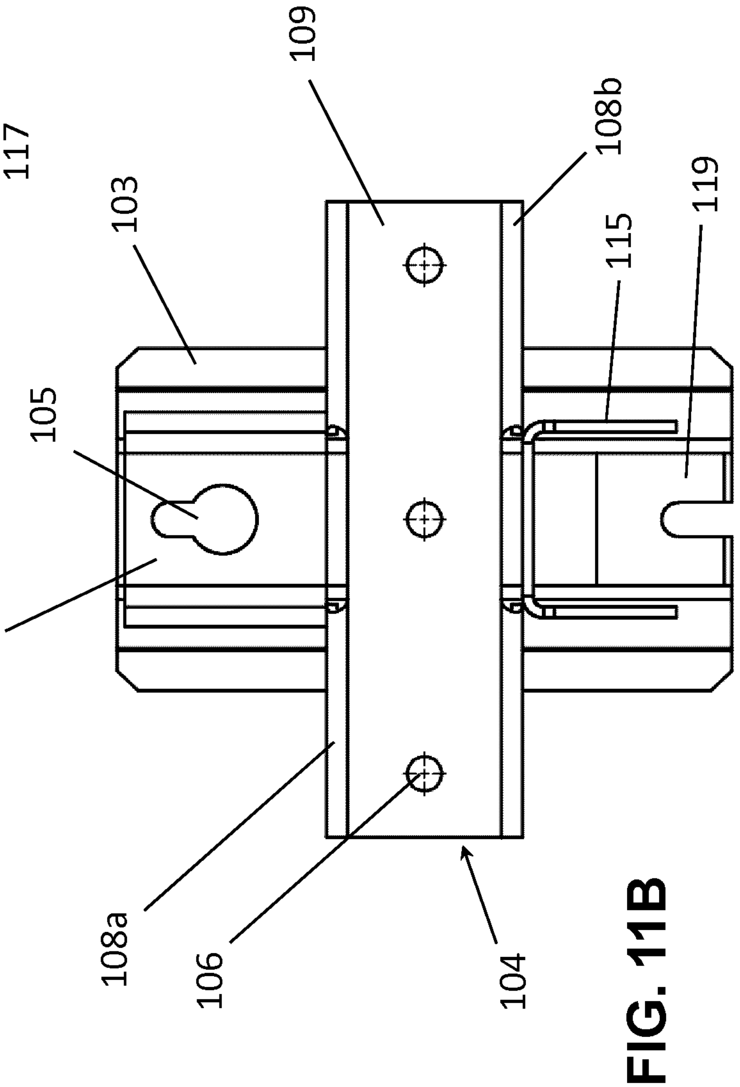

As can also be seen in FIG. 11B, for example, tangent bracket 80 includes a second reinforcing doubler 119 secured, for example by welding, to pole-mounting member 114. Reinforcing doubler 119 has a recess formed therein whose shape conforms to the shape of mounting recess 120 formed within pole-mounting member 114. Reinforcing doubler 119 may provide increased strength and local stiffness to pole-mounting member 114 when pole-mounting member 114 is mounted to the utility pole by engaging a corresponding fastener with mounting recess 120 and reinforcing doubler 119.

Figure 12:
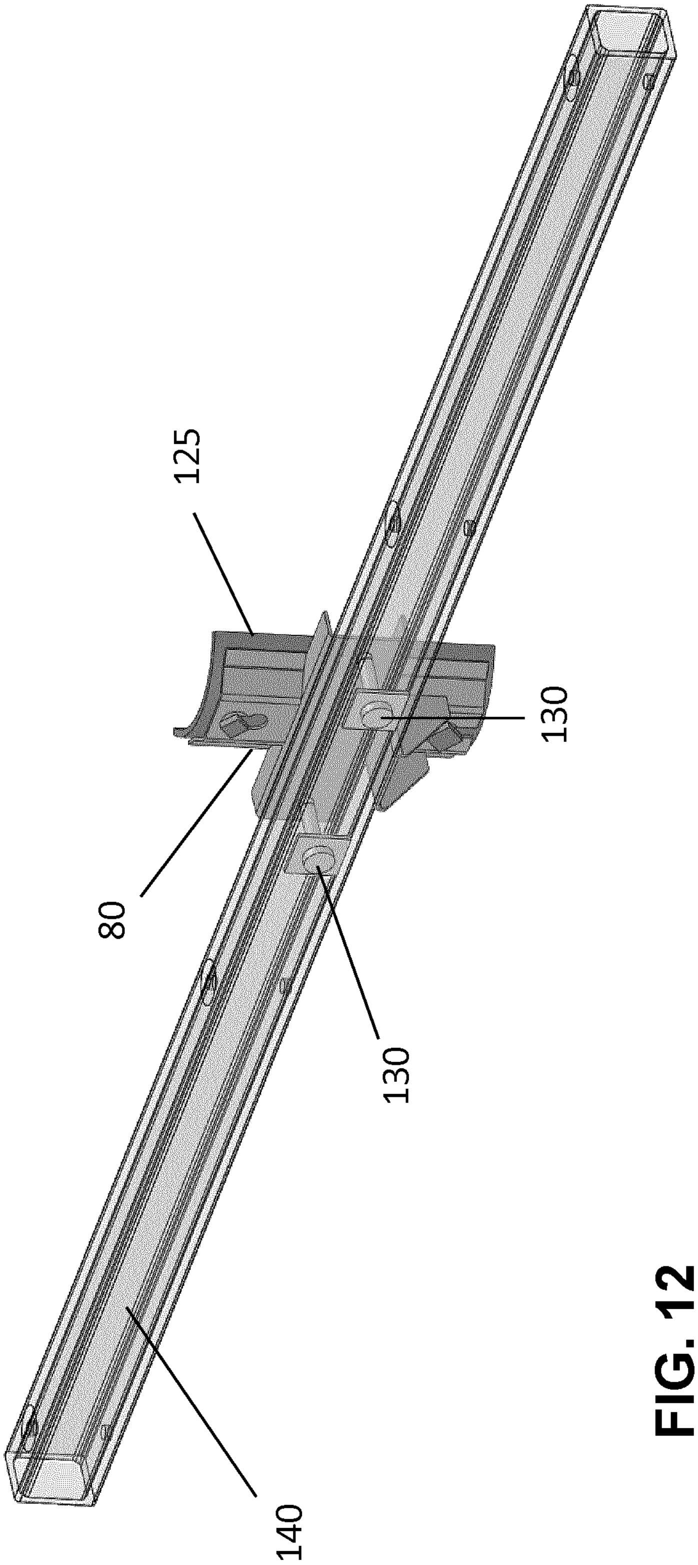
FIG. 12 shows a crossarm secured to a utility pole using a tangent bracket according to an embodiment of the disclosure.

Turning to FIG. 12, there is shown an embodiment of a crossarm 140 secured to tangent bracket 80. Bolts extend horizontally through crossarm 140 at locations 130. The bolts are aligned in the plane of the conductors to react the transverse and vertical crossarm loads. Together, the pole-mounting member and the crossarm-mounting member work with the bolts to minimize deflection and avoid yielding or structural failures. While two bolts are shown in FIG. 12, for heavier-duty applications more than two bolts, such as three bolts, may be used to secure crossarm 140 to bracket 80.

While brackets according to embodiments of the disclosure have been described as comprising one or more components welded to one another, it shall be understood that according to some embodiments the components may be fastened or secured to one another using other means. For example, instead of securing the crossarm-mounting member to the pole-mounting member by welding, the crossarm-mounting member may be secured to the pole-mounting member using bolts or other fasteners.

According to embodiments of the disclosure, the brackets described herein may be constructed of a suitably strong material, such as steel, although the disclosure extends to any other suitable material, such as aluminium or a lightweight material with suitable strength and stiffness to impart a similar response as a steel bracket, provided that substantially equivalent strength and stiffness can be achieved to support the loading present in utility applications.

Typically, with cold-rolled steel construction, the potential for corrosion exists, and steel hardware is typically coated, plated, or galvanized to avoid corrosion. According to some embodiments, brackets as described herein may comprise steel with a hot-dip galvanizing layer to be added secondarily to minimize the potential for corrosion over the service life of the bracket. Similarly, utility grade fasteners and related hardware (washers, nuts, etc.) may also comprise hot-dipped galvanized steel. Alternative fasteners may be made of other suitable corrosion-resistant materials.

Turning to FIGS. 13A and 13B, 14A and 14B, 15A-15C, and 16A-16C, there are shown embodiments of deadend brackets (such as deadend brackets 10 and 30) that may be used to transfer loads to guy-wires by using guy-wire attachments secured to the deadend brackets.

Figure 13B:
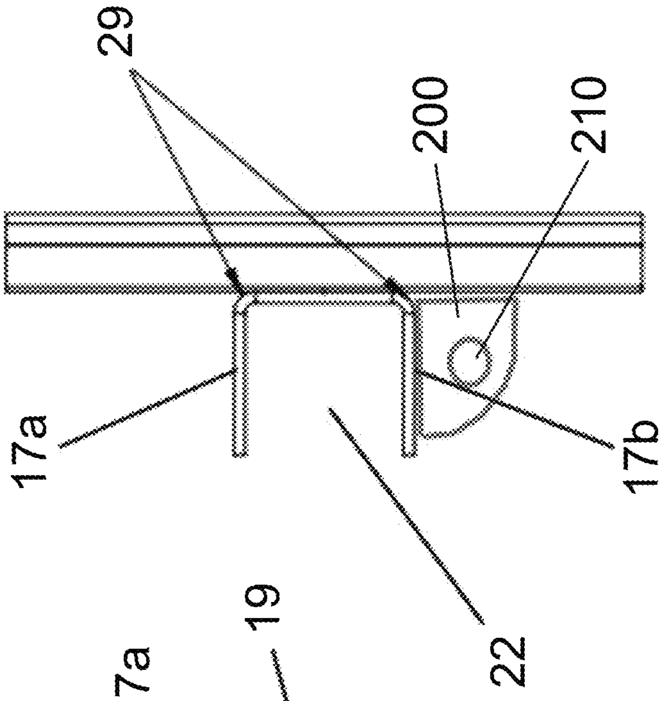
FIGS. 13A and 13B are front and side views of a single guy tab connection for a deadend bracket, according to an embodiment of the disclosure.
Figure 13A:
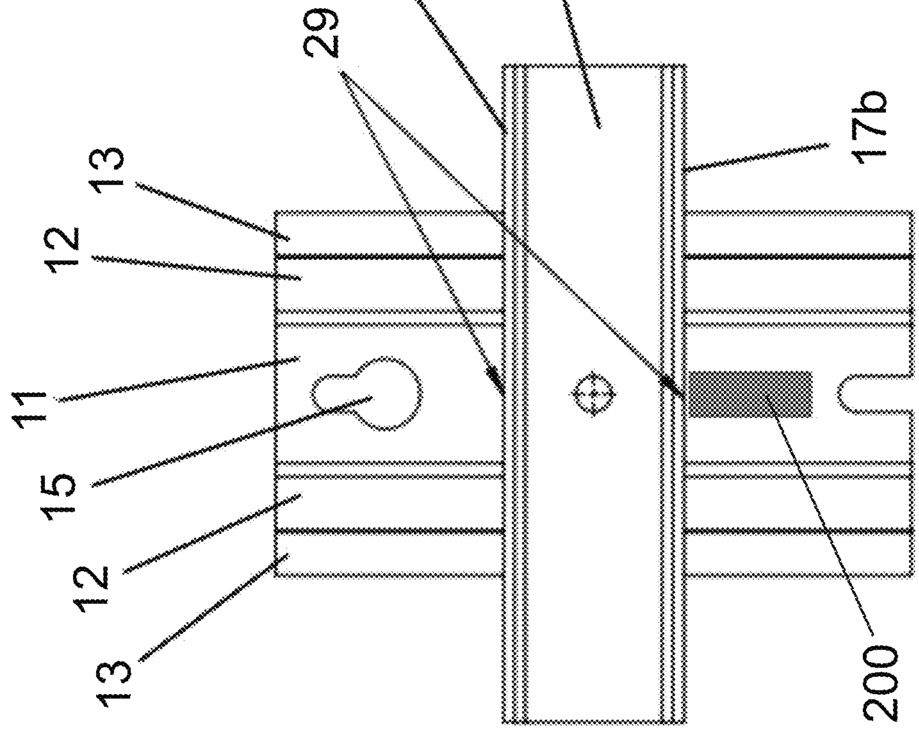

In FIGS. 13A and 13B, there is shown a guy tab connection 200 secured to deadend bracket 10. In particular, guy tab connection 200 is secured to an underside of lower wall 17*b* of crossarm-mounting member 14 and to first plate portion 11 of pole-mounting member 24. Guy tab connection 200 includes a guy attachment hole 210 for securing a guy-wire therethrough. The line termination loads of a crossarm supported in the deadend bracket may be transferred to the ground by guying with a guy-wire placed at an angle from guy tab connection 200 to the ground and secured with a ground anchor tied to the guy-wire.

Figure 14B:
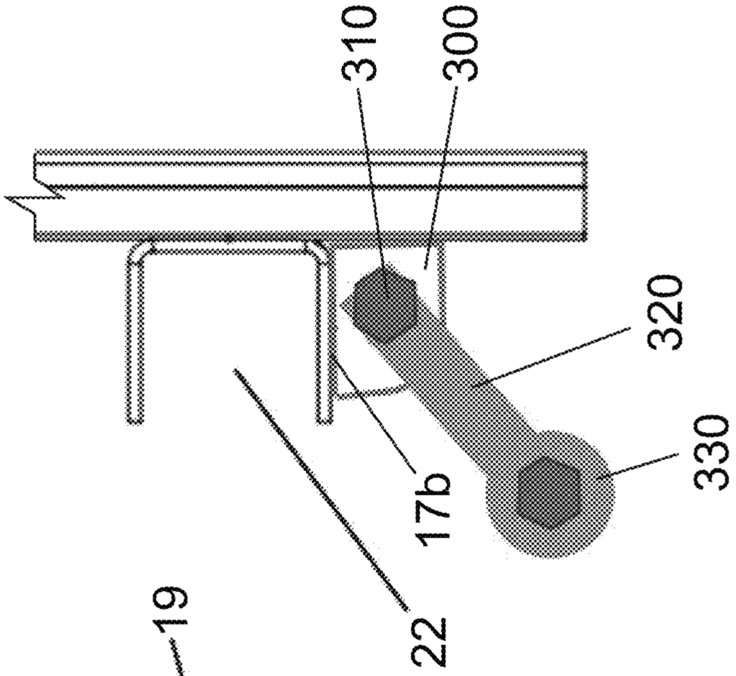
FIGS. 14A and 14B are front and side views of a double tab and plate with guy roller connection for a deadend bracket, according to an embodiment of the disclosure.
Figure 14A:
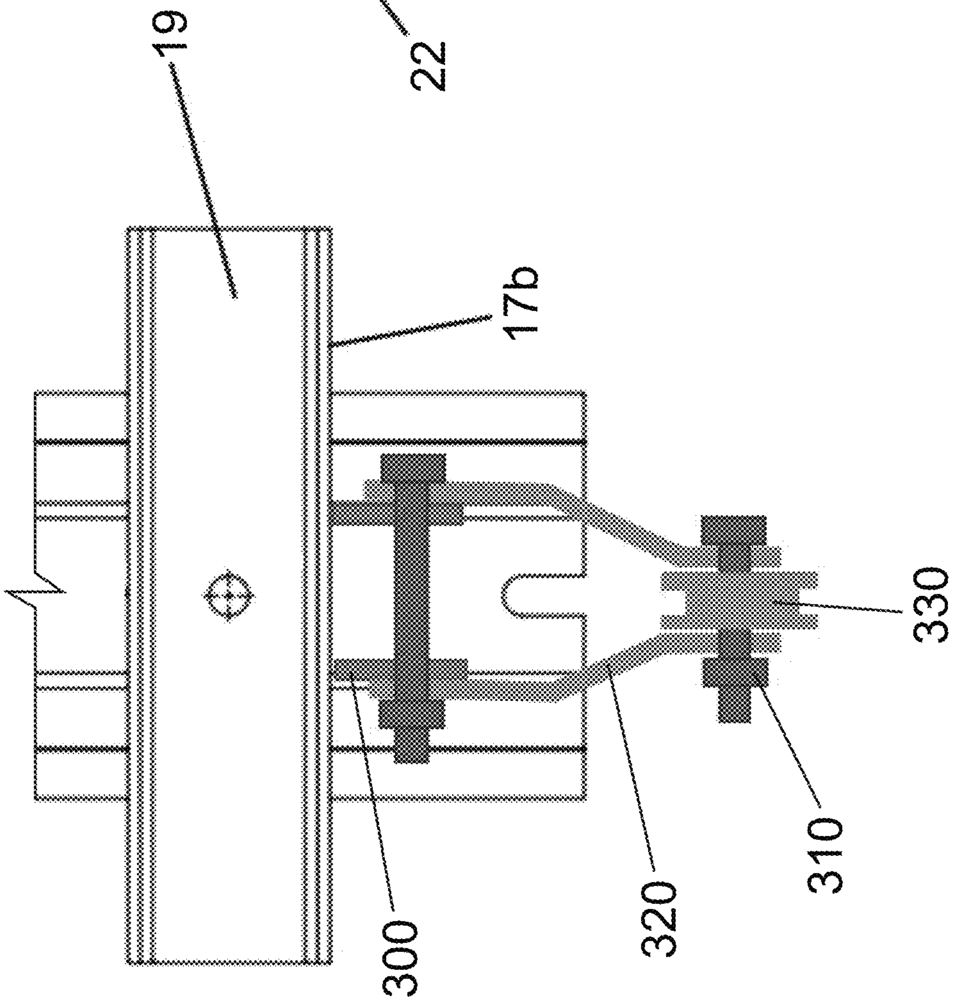

In FIGS. 14A and 14B, there are shown a double tab and plate with a guy roller connection, secured to deadend bracket 10. In particular, a pair of tees 300 are secured to an underside of lower wall 17*b* of crossarm-mounting member 14 and to first plate portion 11 of pole-mounting member 24. A first bolt 310 extends through tees 300 and is connected to the guy roller connection using a pair of guy tabs 320. A second bolt 310 extends through ends of guy tabs 320 and secures a roller 330 to guy tabs 320. A guy-wire may be secured to roller 330.

Figure 15C:
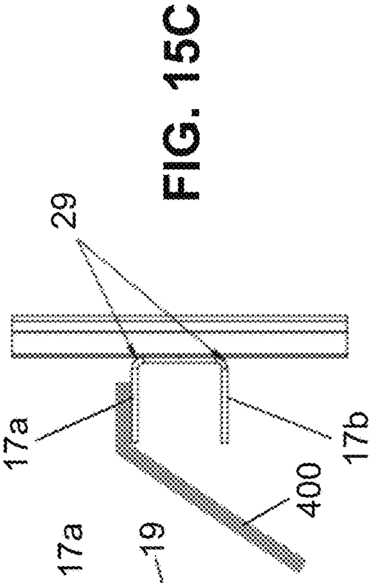
FIGS. 15A-15C are front, perspective, and side views of a formed angle plate guy connection for a deadend bracket, according to an embodiment of the disclosure.
Figure 15A:
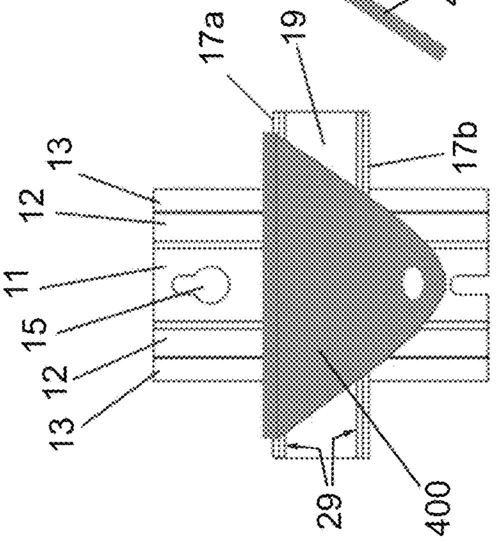
Figure 15B:
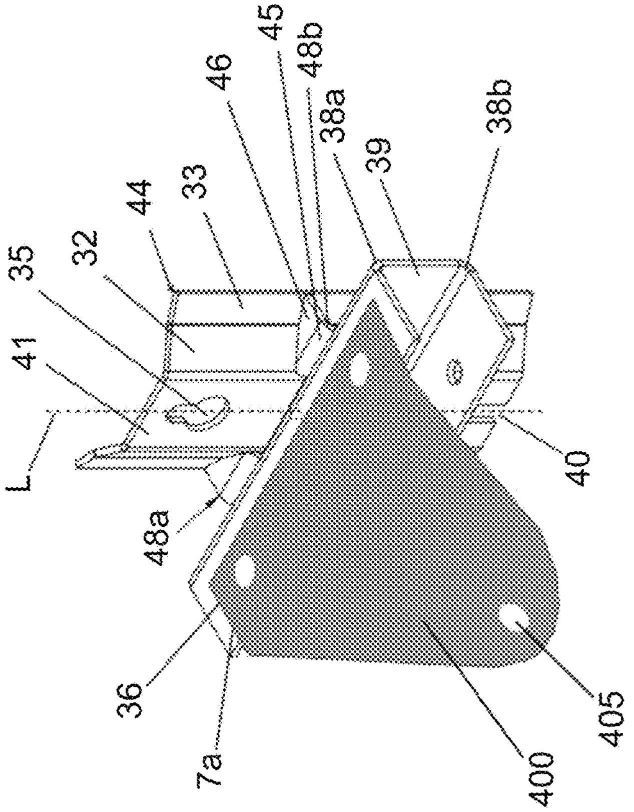

In FIGS. 15A-15C, there is shown a formed plate 400 secured to deadend bracket 30. In particular, formed plate 400 is secured to upper wall 37*a* of crossarm-mounting member 34 and extends downwardly therefrom. Formed plate 400 includes a guy attachment hole 405 for securing a guy-wire therethrough. This type of guy-wire attachment mechanism may generally be used for light-duty applications.

Figures 16A, 16B, 16C:
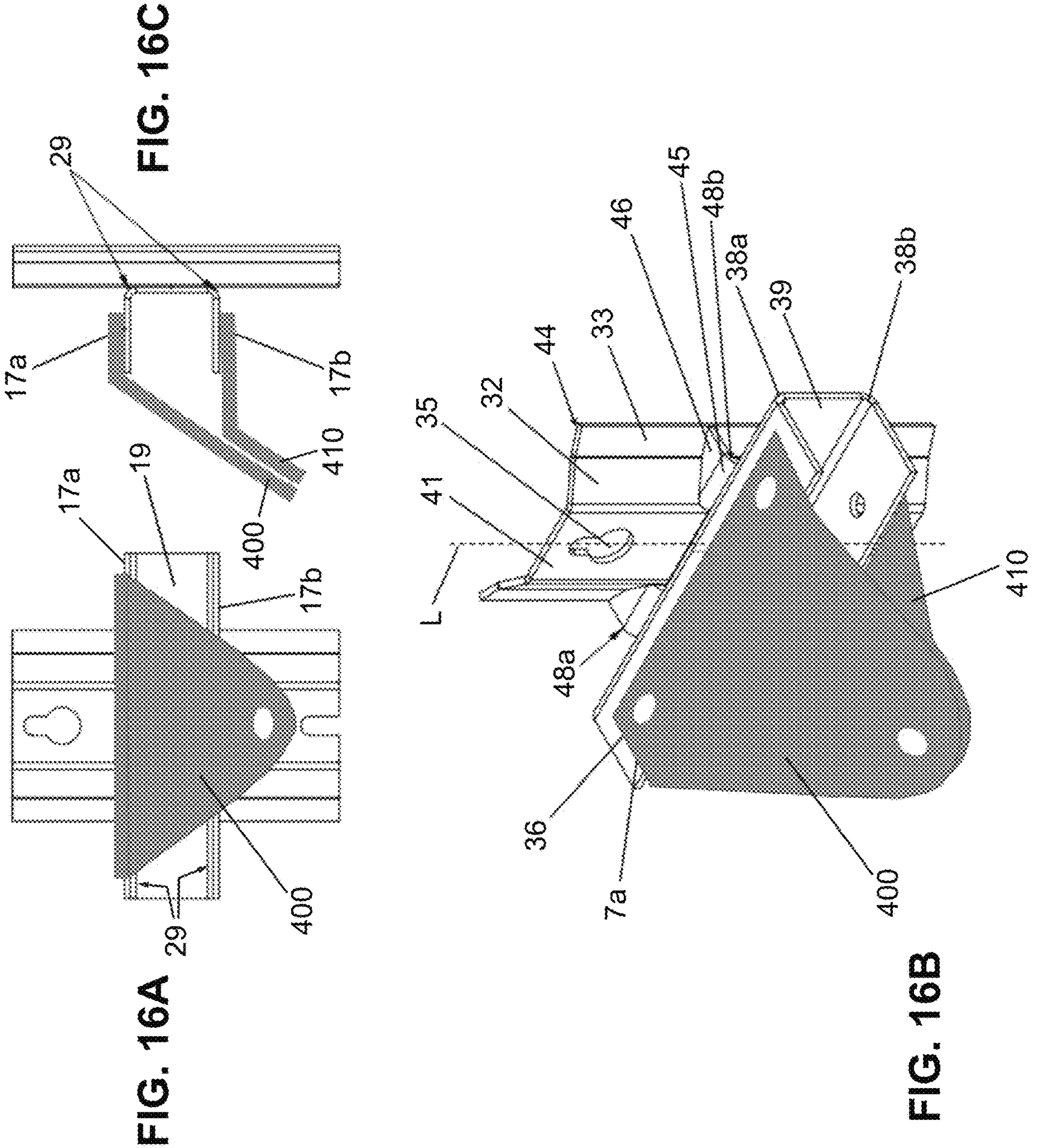
FIGS. 16A-16C are front, perspective, and side views of a double formed angle plate guy connection for a deadend bracket, according to an embodiment of the disclosure.

In FIGS. 16A-16C, there is shown a pair of formed plates 400 and 410 secured to deadend bracket 30. In particular, formed plate 400 is secured to upper wall 37*a* of crossarm-mounting member 34 and extends downwardly therefrom. Formed plate 410 is secured to an underside of lower wall 37*b* of crossarm-mounting member 34 and extends downwardly therefrom, in a direction parallel to and adjacent to formed plate 400. Formed plates 400 and 410 include guy attachment holes 410 for securing a guy-wire therethrough. This type of guy-wire attachment mechanism may generally be used for heavy-duty applications.

Turning to FIGS. 17 and 18A-18C, there are shown different views of another embodiment of a deadend bracket 200 for securing a crossarm to a utility pole. Deadend bracket 200 may be used to transfer primary and secondary conductor loads, in deadend applications, from the crossarm to the utility pole.

Deadend bracket 200 comprises a vertically-oriented pole-mounting member 224, and a pair of horizontally-oriented crossarm-mounting members secured to pole-mounting member 24. In particular, the crossarm-mounting members comprise an upper plate 217*a* and an opposed lower plate 217*b*. It will be understood that the terms "vertically-oriented" and "horizontally-oriented" are relative terms, and are used to described the respective orientations of pole-mounting member 224 and upper and lower plates 217*a*, 217*b* relative to a vertically-oriented utility pole (not shown). It shall therefore be understood that, in other contexts, pole-mounting member 224 need not be vertically oriented, and upper and lower plates 217*a*, 217*b* need not be horizontally oriented.

Pole-mounting member 224 includes a pole-receiving side and a crossarm-receiving side opposite the pole-receiving side. Pole-mounting member 224 is used to mount deadend bracket 200 to a utility pole by engaging the pole-receiving side of pole-mounting member 224 to the utility pole. Pole-mounting member 224 enables deadend bracket 200 to interface with the utility pole and transfer the load applied by the crossarm over a relatively large area, while securing deadend bracket 200 to the utility pole. As described in further detail below, pole-mounting member 224 is shaped to conform to the round shape of utility pole tops, with a tapered flange design that enables deadend bracket 200 to mate to a range of pole diameters and make contact with the utility pole along the vertical length of pole-mounting member 224.

When viewed along a horizontal cross-section, pole-mounting member 224 has a generally frustoconical shape. In particular, pole-mounting member 224 includes a first plate portion 211, a pair of second plate portions 212, and a pair of third plate portions 213. Second plate portions 212 are angled relative to first plate portion 211, and extend away from upper and lower plates 217*a*, 217*b*. Third plate portions 213 are angled relative to second plate portions 212 and extend away from upper and lower plates 217*a*, 217*b*. Second plate portions 212 are angled relative to first plate portion 211 such that the obtuse angles formed therebetween are located on the pole-receiving side of pole-mounting member 224. Third plate portions 213 are angled relative to second plate portion 212 such that the obtuse angles formed therebetween are located on the crossarm-receiving side of pole-mounting member 224. This angling may result in a relatively smooth radius on the pole-receiving side at the interface of second plate portions 212 and third plate portions 213. This may ensure that little or no gouging of the underlying pole will occur, which may be important for ensuring structural integrity of the pole.

Pole-mounting member 224 includes a number of mounting apertures for mounting deadend bracket 200 to the utility pole. In particular, at an upper end of pole-mounting member 224, there is provided a key-hole aperture 215. At a bottom end of pole-mounting member 224, there is provided a mounting recess 220, forming a slot feature, extending from a bottom edge 221 of pole-mounting member 224 upwards towards a top edge of pole-mounting member 224. In order to mount deadend bracket 200 to a utility pole, key-hole aperture 215 and mounting recess 220 are aligned with and receive corresponding fasteners provided on the utility pole. Deadend bracket 200 is then translated downwardly until the fasteners engage with key-hole aperture 215 and mounting recess 220, at which point the fasteners are tightened to the recommended torque to ensure they will not loosen over time, thereby securing deadend bracket 200 to the utility pole.

Figures 18A, 18B, 18C:
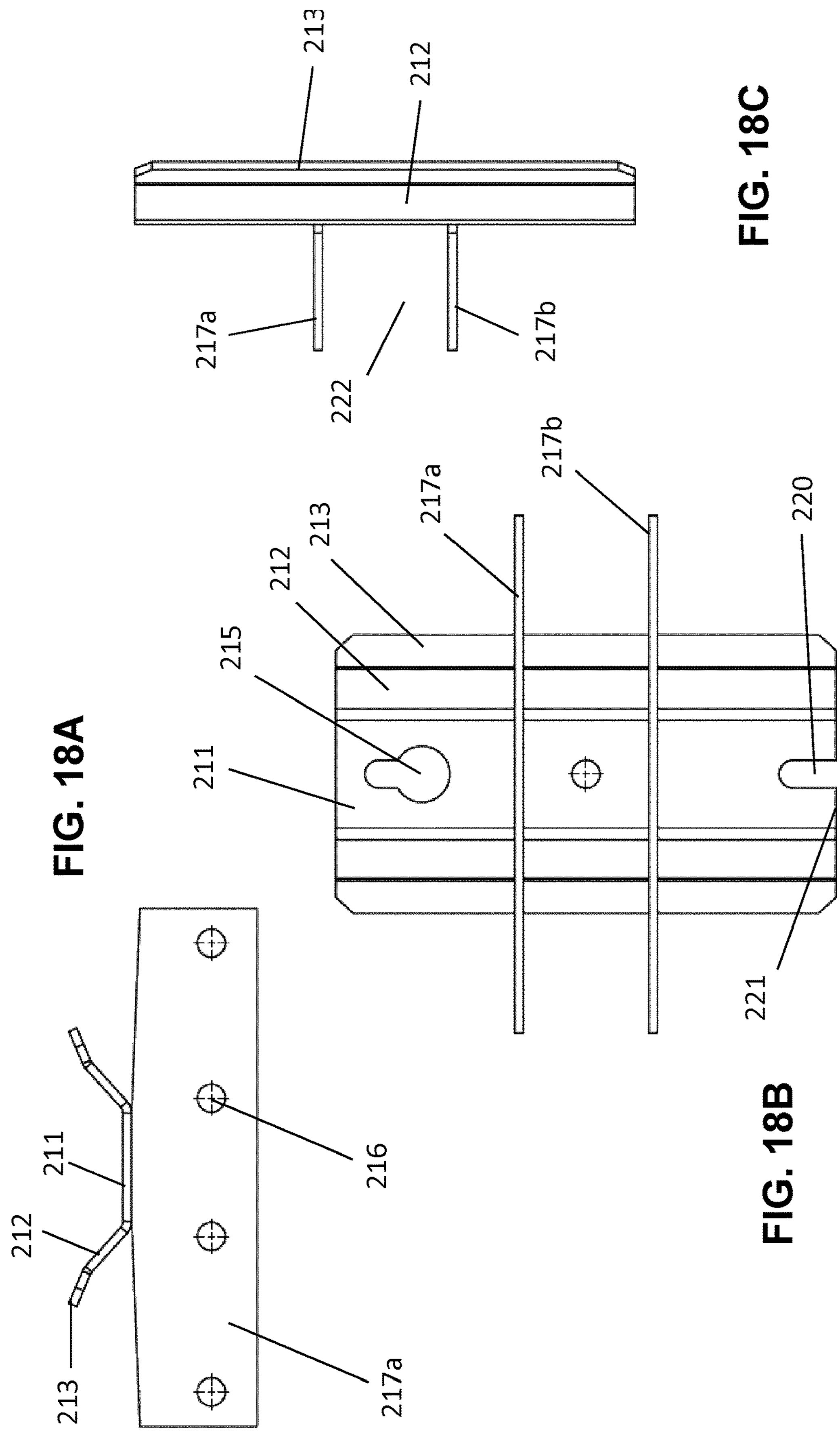
FIGS. 18A-18C are top, front, and side views of the deadend bracket of FIG. 17.

Upper and lower plates 217*a*, 217*b* extend perpendicularly away from the pole-receiving side of pole-mounting member 224. Upper and lower plates 217*a*, 217*b* are secured to pole-mounting member 224 by welding upper and lower plates 217*a*, 217*b* across the entire width of first plate portion 211. As can be seen in FIG. 18A, upper edges of upper and lower plates 217*a*, 217*b* form obtuse angles relative of the side edges of upper and lower plates 217*a*, 217*b*, to thereby provide more room for welding upper and lower plates 217*a*, 217*b* to first plate portion 211.

Figure 17:
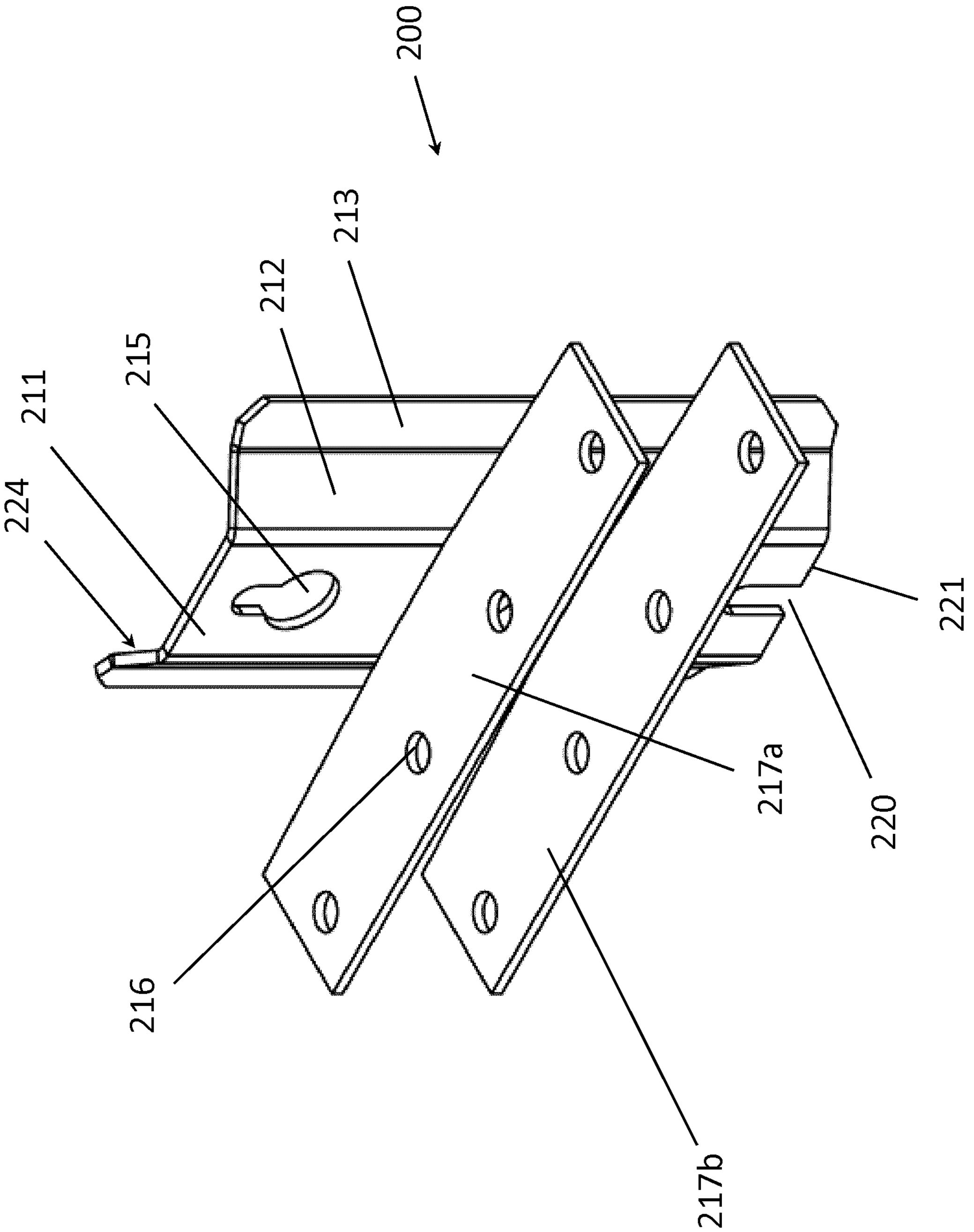
FIG. 17 is a perspective view of a deadend bracket according to another embodiment of the disclosure.

As can be seen in FIGS. 17, 18B, and 18C, upper plate 217*a* includes a lower surface facing lower plate 217*b*, and lower plate 217*b* includes an upper surface facing upper plate 217*a*. The lower surface of upper plate 217*a*, the upper surface of lower plate 217*b*, and first plate portion 211 define interconnected walls of a channel 222 for receiving therein at least a portion the crossarm. Mounting apertures 216 are provided within upper and lower plates 217*a*, 217*b*. Fasteners such as through-bolts with nuts are used to secure the crossarm to upper and lower plates 217*a*, 217*b* with the crossarm received within channel 222. Channel 222 is shaped such that the crossarm is securely attached to upper and lower plates 217*a*, 217*b*, with upper and lower plates 217*a*, 217*b* creating a surface against which fastening nuts can bear tightly for securing the crossarm to upper and lower plates 217*a*, 217*b*. In combination with first plate portion 211 of pole-mounting member 224, upper and lower plates 217*a*, 217*b* may therefore wrap around the crossarm to resist deflection and yielding of deadend bracket 200 from termination loads at the end of the power line.

Figure 19:
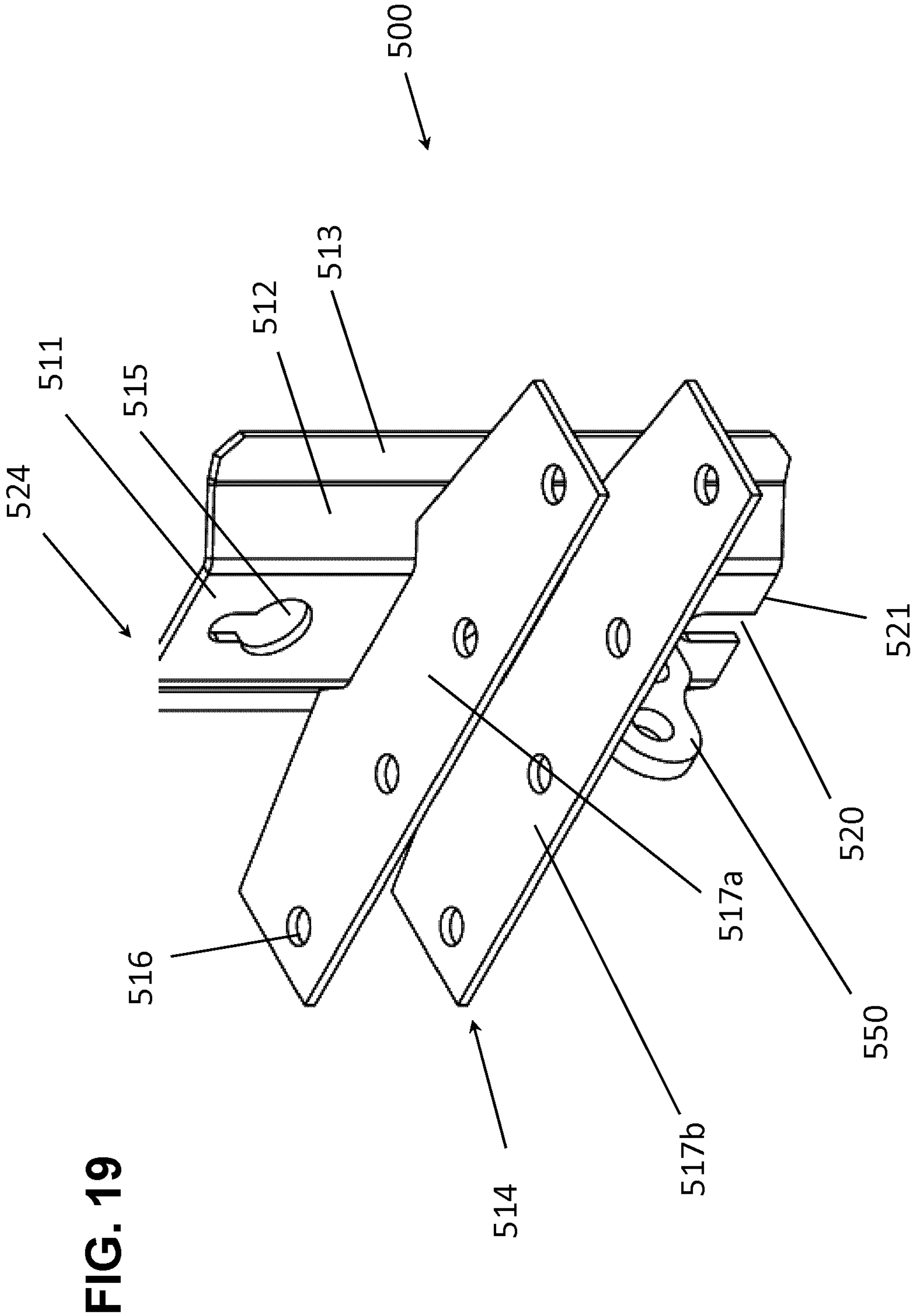
FIG. 19 is a perspective view of a deadend bracket according to another embodiment of the disclosure.
Figure 20A:
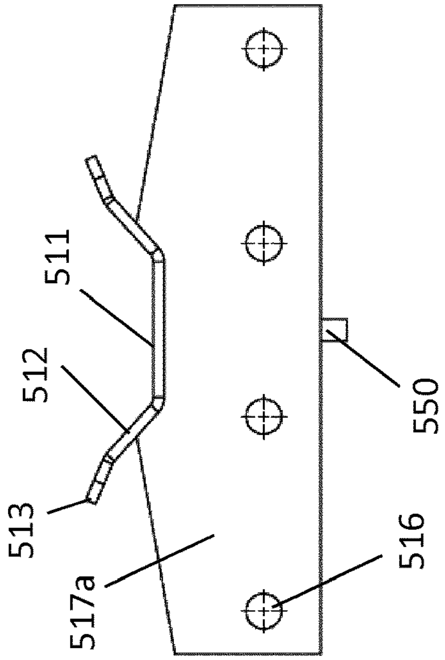
FIGS. 20A-20C are top, front, and side views of the deadend bracket of FIG. 19.
Figure 20C:
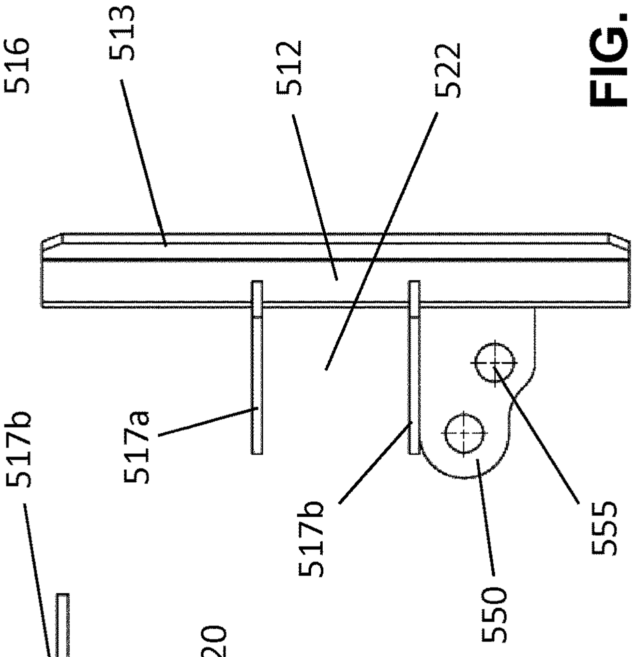
Figure 20B:
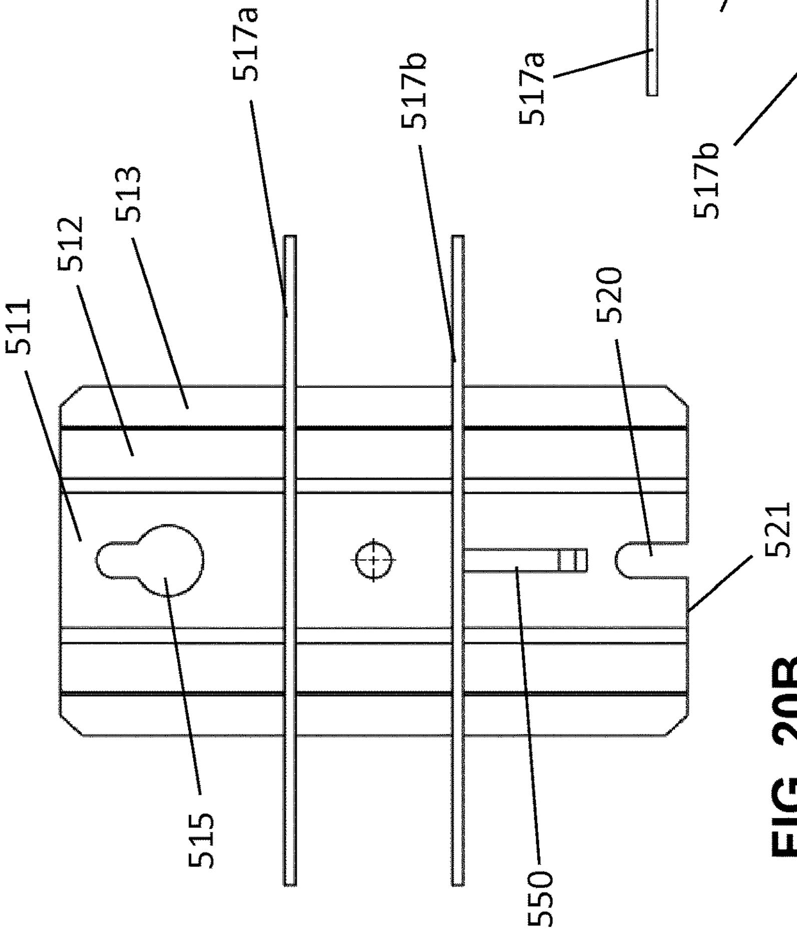

FIGS. 19 and 20A-20B show different views of another embodiment of a deadend bracket 500 for securing a crossarm to a utility pole. Deadend bracket 500 is similar to deadend bracket 200, and like features are labelled using like reference numbers. However, deadend bracket 500 may be used for heavier-duty applications than deadend bracket 200.

In particular, in order to assist in dealing with such application, deadend bracket 500 includes a supporting member 550 having apertures 555 formed therein for attaching a guy-wire to supporting member 550. Supporting member 550 is vertically oriented and secured (e.g. by welding) to the underside of lower plate 517*b* and first plate portion 511. As discussed above, the line termination loads of a crossarm supported in the deadend bracket may be transferred to the ground by guying with a guy-wire placed at an angle from supporting member 550 to the ground and secured with a ground anchor tied to the guy-wire.

In addition to supporting member 550, upper and lower plates 517*a*, 517*b* are secured (e.g. welded) across an entirety of a width of first plate portion 511 and to a portion of each of second plate portions 512. In addition, compared to deadend bracket 200, upper edges of upper and lower plates 517*a*, 517*b* form relatively larger obtuse angles relative of the side edges of upper and lower plates 517*a*, 517*b*, to thereby provide more room for welding upper and lower plates 517*a*, 517*b* to second plate portions 512.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A bracket for securing a crossarm to a utility pole, comprising:
- a pole-mounting member for mounting to the utility pole by engaging a pole-receiving side of the pole-mounting member to the utility pole;
- a crossarm-mounting member secured to the pole-mounting member and comprising:
  - a rear plate; and
  - walls extending from the rear plate and away from the pole-receiving side of the pole-mounting member, wherein the rear plate and the walls define a channel for receiving the crossarm, and wherein the bracket further comprises at least one supporting member secured to the rear plate of the crossarm-mounting member and to the pole-mounting member, for resisting a load applied to the crossarm-mounting member when the crossarm is received within the channel, and wherein the at least one supporting member comprises:
- a plate portion secured to the rear plate of the crossarm-mounting member; and
- a pair of gusset portions extending from the plate portion and secured to the pole-mounting member, wherein the pair of gusset portions meet the plate portion along respective curved edges.

2. A bracket for securing a crossarm to a utility pole, comprising:
- a pole-mounting member for mounting to the utility pole by engaging a pole-receiving side of the pole-mounting member to the utility pole;
- a crossarm-mounting member secured to the pole-mounting member and comprising:
  - a mounting plate for mounting the crossarm to the crossarm-mounting member; and
  - walls extending from the mounting plate and toward the pole-receiving side of the pole-mounting member, wherein the walls comprise upper walls and lower walls, and wherein the upper walls and the lower walls define a groove within which is received the pole-mounting member; and
- a support member secured to the pole-mounting member in a position for supporting the crossarm when the crossarm is mounted to the mounting plate, wherein the support member comprises a plate portion and a pair of gusset portions extending from the plate portion and secured to the pole-mounting member and wherein the plate portion meets the pair of gusset portions at respective curved edges.

3. The bracket of claim 1, wherein the at least one supporting member comprises:
- a first supporting member on a first side of a longitudinal axis defined by the pole-mounting member; and
- a second supporting member on a second side of the longitudinal axis, wherein the second side is opposite the first side.

4. The bracket of claim 1, wherein the crossarm-mounting member is welded to the pole-mounting member.

5. The bracket of claim 1, wherein the pole-mounting member comprises one or more mounting apertures at a top end thereof, for receiving one or more fasteners for mounting the pole-mounting member to the utility pole.

6. The bracket of claim 5, wherein the one or more apertures comprise at least one key-hole aperture.

7. The bracket of claim 1, wherein the pole-mounting member comprises a mounting recess at a bottom edge thereof, for mounting the pole-mounting member to the utility pole.

8. The bracket of claim 7, wherein the mounting recess extends from the bottom edge of the pole-mounting member upwards towards a top edge of the pole-mounting member.

9. The bracket of claim 1, wherein the pole-mounting member has a generally frustoconical cross-sectional shape.

10. The bracket of claim 1, wherein the pole-mounting member comprises:
- a first plate portion;
- a pair of second plate portions angled relative to the first plate portion, extending from the first plate portion, and extending away from the crossarm-mounting member; and
- a pair of third plate portions angled relative to the second plate portions, extending from the second plate portions, and extending away from the crossarm-mounting member.

11. The bracket of claim 10, wherein the at least one supporting member is secured to one or more of the pair of second plate portions and the pair of third plate portions.

12. The bracket of claim 11, wherein the at least one supporting member is welded to one or more of the pair of second plate portions and the pair of third plate portions.

13. The bracket of claim 1, wherein the walls of the crossarm-mounting member meet the rear plate of the crossarm-mounting member along respective curved edges.

14. The bracket of claim 1, wherein the crossarm-mounting member comprises apertures for receiving fasteners therethrough.

15. The bracket of claim 2, wherein a cross-sectional shape of the pole-mounting member substantially conforms to a shape of the groove.

16. The bracket of claim 2, wherein the crossarm-mounting member comprises apertures for receiving fasteners therethrough.

17. The bracket of claim 2, wherein the pole-mounting member comprises one or more mounting apertures at a top end thereof, for receiving one or more fasteners for mounting the pole-mounting member to the utility pole.

18. The bracket of claim 17, wherein the one or more apertures comprise at least one key-hole aperture.

19. The bracket of claim 2, further comprising a first reinforcing doubler secured to the pole-mounting member.

20. The bracket of claim 19, wherein the first reinforcing doubler comprises one or more doubler apertures formed therein.

21. The bracket of claim 20, wherein the pole-mounting member comprises one or more mounting apertures at a top end thereof, for receiving one or more fasteners for mounting the pole-mounting member to the utility pole, wherein a shape of the one or more doubler apertures corresponds to a shape of the one or more mounting apertures of the pole-mounting member.

22. The bracket of claim 2, wherein the pole-mounting member comprises a mounting recess at a bottom edge thereof, for mounting the pole-mounting member to the utility pole.

23. The bracket of claim 22, wherein the mounting recess extends from the bottom edge of the pole-mounting member upwards towards a top edge of the pole-mounting member.

24. The bracket of claim 19, further comprising a second reinforcing doubler secured to the pole-mounting member.

25. The bracket of claim 24, wherein the second reinforcing doubler comprises a doubler recess formed therein.

26. The bracket of claim 25, wherein the pole-mounting member comprises a mounting recess at a bottom edge thereof, for mounting the pole-mounting member to the utility pole, wherein a shape of the doubler recess corresponds to a shape of the mounting recess of the pole-mounting member.

27. The bracket of claim 2, wherein the pole-mounting member has a generally frustoconical cross-sectional shape.

28. The bracket of claim 2, wherein the pole-mounting member comprises:

a first plate portion;

a pair of second plate portions angled relative to the first plate portion, extending from the first plate portion, and extending away from the crossarm-mounting member; and a pair of third plate portions angled relative to the second plate portions, extending from the second plate portions, and extending away from the crossarm-mounting member.

29. The bracket of claim 2, further comprising a guy-wire attachment for securing the bracket to a guy-wire.

30. The bracket of claim 29, wherein the guy-wire attachment comprises one or more tab members secured to an underside of at least one of the walls of the crossarm-mounting member and to the pole-mounting member.

31. The bracket of claim 29, wherein the guy-wire attachment comprises a first end secured relative to the crossarm-mounting member and a second end comprising one or more rotating members rotatable relative to the guy-wire attachment.

32. The bracket of claim 29, wherein the guy-wire attachment comprises a plate member secured to at least one of the walls of the crossarm-mounting member.

33. The bracket of claim 32, further comprising a further plate member secured to at least another one of the walls of the crossarm-mounting member.

34. A bracket for securing a crossarm to a utility pole, comprising:

a pole-mounting member for mounting to the utility pole by engaging a pole-receiving side of the pole-mounting member to the utility pole comprising:

a first plate portion;

a pair of second plate portions angled relative to the first plate portion, extending from the first plate portion, and extending away from the crossarm-mounting member; and a pair of third plate portions angled relative to the second plate portions, extending from the second plate portions, and extending away from the crossarm-mounting member;

a crossarm-mounting member secured to the pole-mounting member and comprising:

a rear plate; and walls extending from the rear plate and away from the pole-receiving side of the pole-mounting member, wherein the rear plate and the walls define a channel for receiving the crossarm, and wherein the bracket further comprises at least one supporting member secured to the rear plate of the crossarm-mounting member and to the pole-mounting member, for resisting a load applied to the crossarm-mounting member when the crossarm is received within the channel, and wherein the at least one supporting member comprises:

a fourth plate portion secured to the rear plate of the crossarm-mounting member; and a pair of gusset portions extending from the fourth plate portion and secured to the pole-mounting member.

35. The bracket of claim 34, wherein the at least one supporting member comprises:

a first supporting member on a first side of a longitudinal axis defined by the pole-mounting member; and a second supporting member on a second side of the longitudinal axis, wherein the second side is opposite the first side.

36. The bracket of claim 34, wherein the pair of gusset portions meet the fourth plate portion along respective curved edges.

37. The bracket of claim 34, wherein the crossarm-mounting member is welded to the pole-mounting member.

38. The bracket of claim 34, wherein the pole-mounting member comprises one or more mounting apertures at a top end thereof, for receiving one or more fasteners for mounting the pole-mounting member to the utility pole.

39. The bracket of claim 38, wherein the one or more apertures comprise at least one key-hole aperture.

40. The bracket of claim 34, wherein the pole-mounting member comprises a mounting recess at a bottom edge thereof, for mounting the pole-mounting member to the utility pole.

41. The bracket of claim 40, wherein the mounting recess extends from the bottom edge of the pole-mounting member upwards towards a top edge of the pole-mounting member.

42. The bracket of claim 34, wherein the pole-mounting member has a generally frustoconical cross-sectional shape.

43. The bracket of claim 34, wherein the at least one supporting member is secured to one or more of the pair of second plate portions and the pair of third plate portions.

44. The bracket of claim 43, wherein the at least one supporting member is welded to one or more of the pair of second plate portions and the pair of third plate portions.

45. The bracket of claim 34, wherein the walls of the crossarm-mounting member meet the rear plate of the crossarm-mounting member along respective curved edges.

46. The bracket of claim 34, wherein the crossarm-mounting member comprises apertures for receiving fasteners therethrough.

47. A bracket for securing a crossarm to a utility pole, comprising:

a pole-mounting member for mounting to the utility pole by engaging a pole-receiving side of the pole-mounting member to the utility pole;

a crossarm-mounting member secured to the pole-mounting member and comprising:

a rear plate; and walls extending from the rear plate and away from the pole-receiving side of the pole-mounting member, wherein the rear plate and the walls define a channel for receiving the crossarm, and wherein the bracket further comprises at least one supporting member secured to the rear plate of the crossarm-mounting member and to the pole-mounting member, for resisting a load applied to the crossarm-mounting member when the crossarm is received within the channel, and wherein the at least one supporting member comprises:

a plate portion secured to the rear plate of the crossarm-mounting member; and a pair of gusset portions extending from the plate portion and secured to the pole-mounting member, wherein the pair of gusset portions meet the plate portion along respective curved edges, wherein the walls of the crossarm-mounting member meet the rear plate of the crossarm-mounting member along respective curved edges.

* * * * *